April 6, 1965 J. G. OSBURN ETAL 3,176,529
MACHINE TOOL TRANSMISSION AND CONTROL MECHANISM
Filed May 27, 1960 11 Sheets-Sheet 2

INVENTORS
John G. Osburn
Jack P. Spridco
BY
Cyril M. Hajewski
Attorney

INVENTORS
John G. Osburn
BY Jack P. Spridco

Cyril M. Hajewsler
Attorney

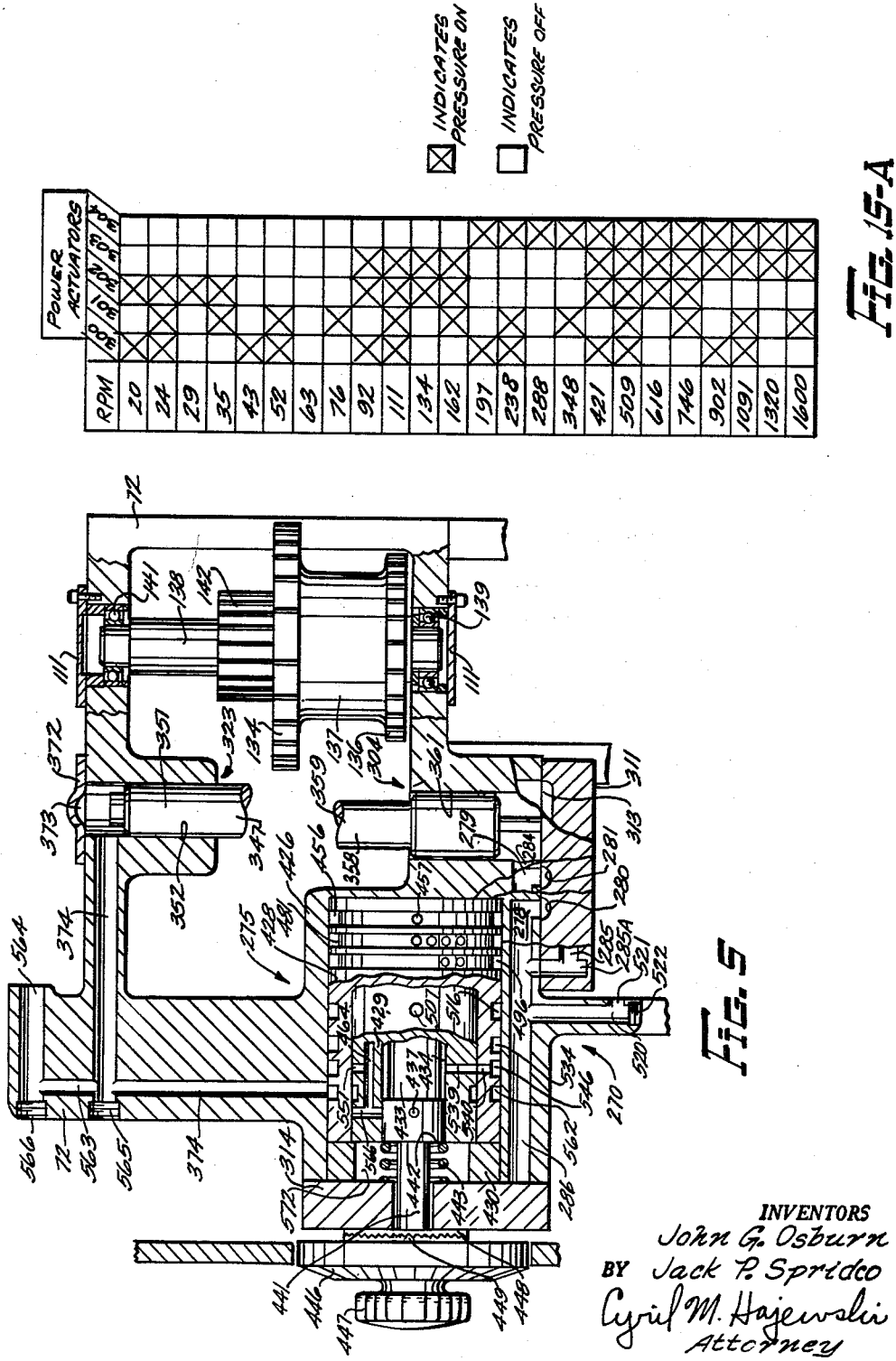

April 6, 1965     J. G. OSBURN ETAL     3,176,529

MACHINE TOOL TRANSMISSION AND CONTROL MECHANISM

Filed May 27, 1960     11 Sheets-Sheet 5

INVENTORS
John G. Osburn
BY   Jack P. Spridco
Cyril M. Hajewski
Attorney

April 6, 1965    J. G. OSBURN ETAL    3,176,529
MACHINE TOOL TRANSMISSION AND CONTROL MECHANISM
Filed May 27, 1960    11 Sheets-Sheet 6

INVENTORS
John G. Osburn
Jack P. Spridco
BY
Cyril M. Hajewski
Attorney

April 6, 1965  J. G. OSBURN ETAL  3,176,529
MACHINE TOOL TRANSMISSION AND CONTROL MECHANISM
Filed May 27, 1960  11 Sheets-Sheet 9

INVENTORS
John G. Osburn
Jack P. Spridco
BY
Cyril M. Hajewski
Attorney

April 6, 1965 J. G. OSBURN ETAL 3,176,529
MACHINE TOOL TRANSMISSION AND CONTROL MECHANISM
Filed May 27, 1960 11 Sheets-Sheet 10

INVENTORS
John G. Osburn
BY Jack P. Spridco
Cyril M. Hajewski
Attorney

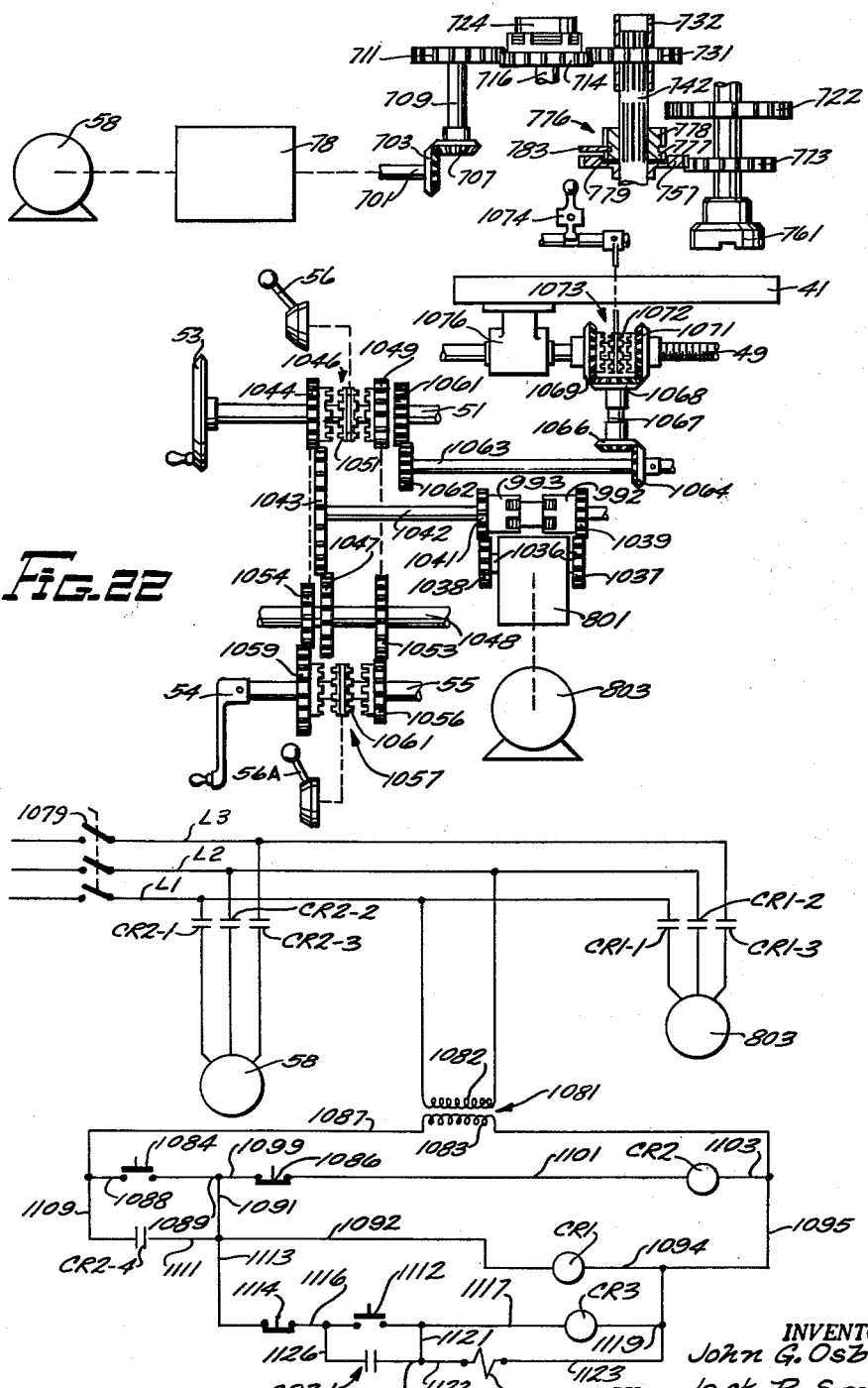

United States Patent Office

3,176,529
Patented Apr. 6, 1965

3,176,529
MACHINE TOOL TRANSMISSION AND
CONTROL MECHANISM
John G. Osburn, Milwaukee, and Jack P. Spridco, New
Berlin, Wis., assignors to Kearney & Trecker Corporation, West Allis, Wis., a corporation of Wisconsin
Filed May 27, 1960, Ser. No. 32,436
31 Claims. (Cl. 74—364)

This invention relates generally to machine tools and more particularly to a shiftably adjustable speed change transmission and control mechanism therefor.

A general object of the invention is to provide an improved simplified transmission mechanism and control mechanism integrated into a single unitary frame to form a compact assembly adapted to be easily removed as a unit from a machine tool.

Another object of the invention is to provide an improved transmission means wherein each shiftable gear has only two shiftably adjustable positions.

Another object of the invention is to provide an improved simplified hydraulic control system adapted to effect gear shifts in a transmission mechanism by means of power actuators which incorporate differential pistons.

Another object is to provide a transmission frame with bored openings which constitute the cylinders for the power actuators and are adapted to carry the actuator pistons.

Another object is to provide an improved simplified rotary valve operative to selectively direct pressure fluid to hydraulic power actuators in predetermined relationship to effect gear shifting in the transmission mechanism.

Another object is to provide an improved hydraulic control system incorporating a time delay mechanism that provides for complete shifting of gears before maximum power is applied to the transmission.

Another object is to provide an improved simplified rapid traverse valve that is operative to effect movement of the worktable at either feed rate or rapid rate while the spindle is idle as well as while it is rotating.

A still further object of the invention is to provide an improved transmission mechanism wherein each shifter fork and the shiftable gears associated therewith are shifted to one of the two shiftably adjustable positions by hydraulic pressure fluid.

A still further object of the invention is to provide a greatly improved hydraulic control system adapted to selectively shift gears for effecting different transmission output speeds without unnecessary intermediate shifting of gears.

According to this invention a machine tool is provided with an improved integrated transmission and control mechanism for selectively operating a tool spindle at a plurality of predetermined speeds. The transmission together with the control mechanism is housed in a transmission frame that is removable from the column of the milling machine as a single unit. The transmission comprises a plurality of gears that are shiftable in different combinations for changing the transmission output speed. The control mechanism includes a plurality of hydraulically operated power actuators, a manifold, a rotary valve and associated hydraulic circuitry. Shifting movement of the shiftable gears is effected by means of the power actuators which are under the control of the rotary valve and are operatively connected to the movable gears by means of shifter rods and shifter forks.

The power actuators are formed in pairs and each pair includes a differential piston arrangement wherein the piston for one of the actuators is smaller in diameter than the diameter of the piston for the other actuator. The pistons are slidably contained in cylinders which are formed by bores in the transmission housing. Each small diameter piston is connected to a large diameter piston by a shifter rod which carries a cooperating shifting fork. A constant pressure of the same value is continuously applied to all of the small diameter pistons while the machine is operating for urging their associated shifting rods in one direction. Movement of the shifting rods in the opposite direction is achieved by applying the same pressure selectively to the large diameter pistons which will serve to overcome the pressure applied to the small diameter pistons by reason of the larger area of the large diameter pistons. The hydraulic pressure is transmitted to the power actuators through a rotary valve which is operable to selectively direct the pressure to the power actuators having the large pistons in any combination for effecting the various gear shifts to obtain the desired output speed. To effect knee, saddle and worktable movement at either feed rate or rapid rate, a rapid traverse valve is interconnected in the hydraulic circuit and is operable to effect the respective movements when the tool spindle is either stopped or rotating.

FIG. 5 is a fragmentary view partly in plan and partly in horizontal section illustrating the compact unit construction of the integrated transmission and control mechanism;

Figure 15:
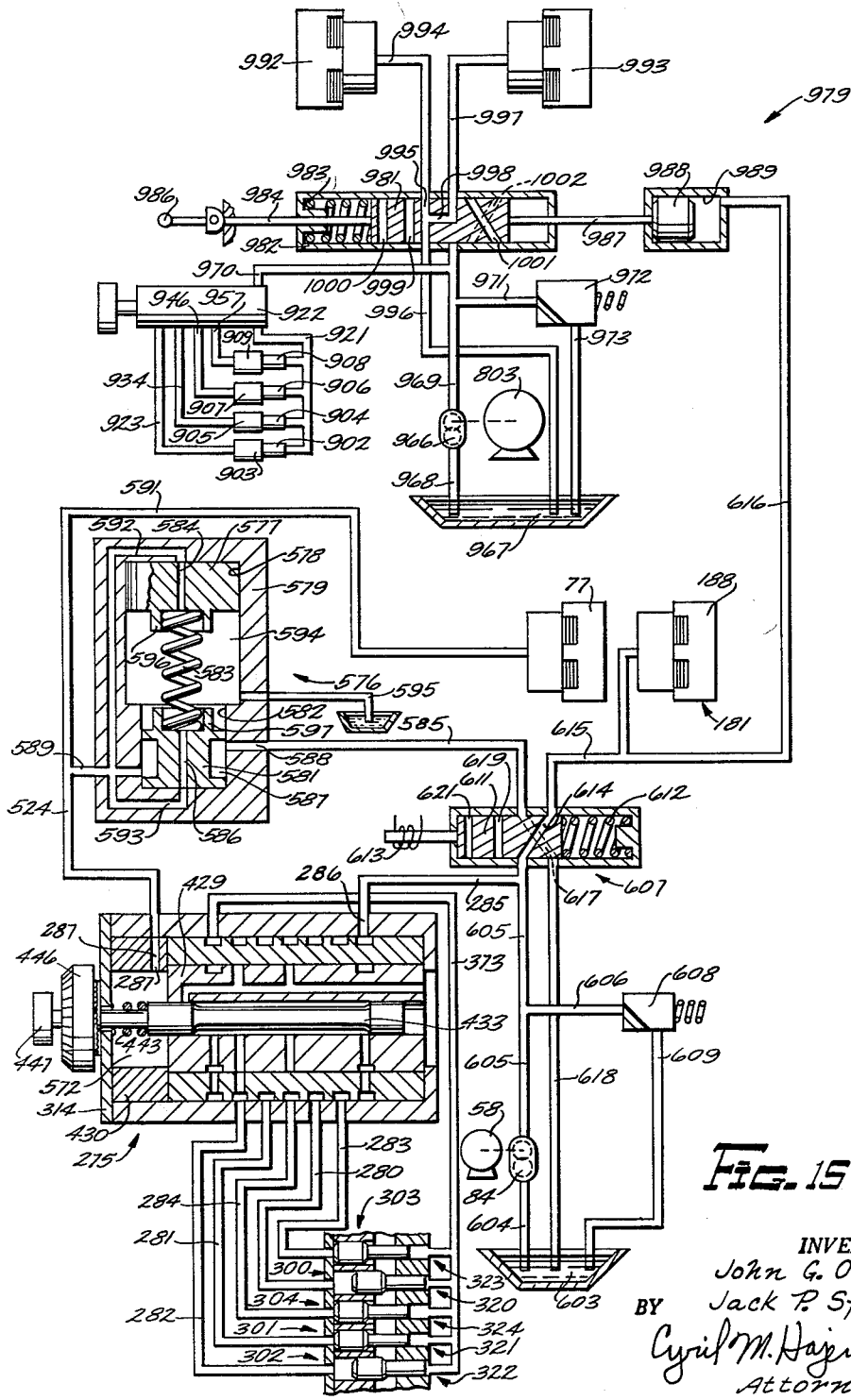
FIG. 15 is a diagrammatic view illustrating the hydraulic circuit employed in this invention.

FIG. 15-A is a chart indicating the actuation and deactuation of particular power actuators necessary to obtain the various spindle speeds.

Figure 16:
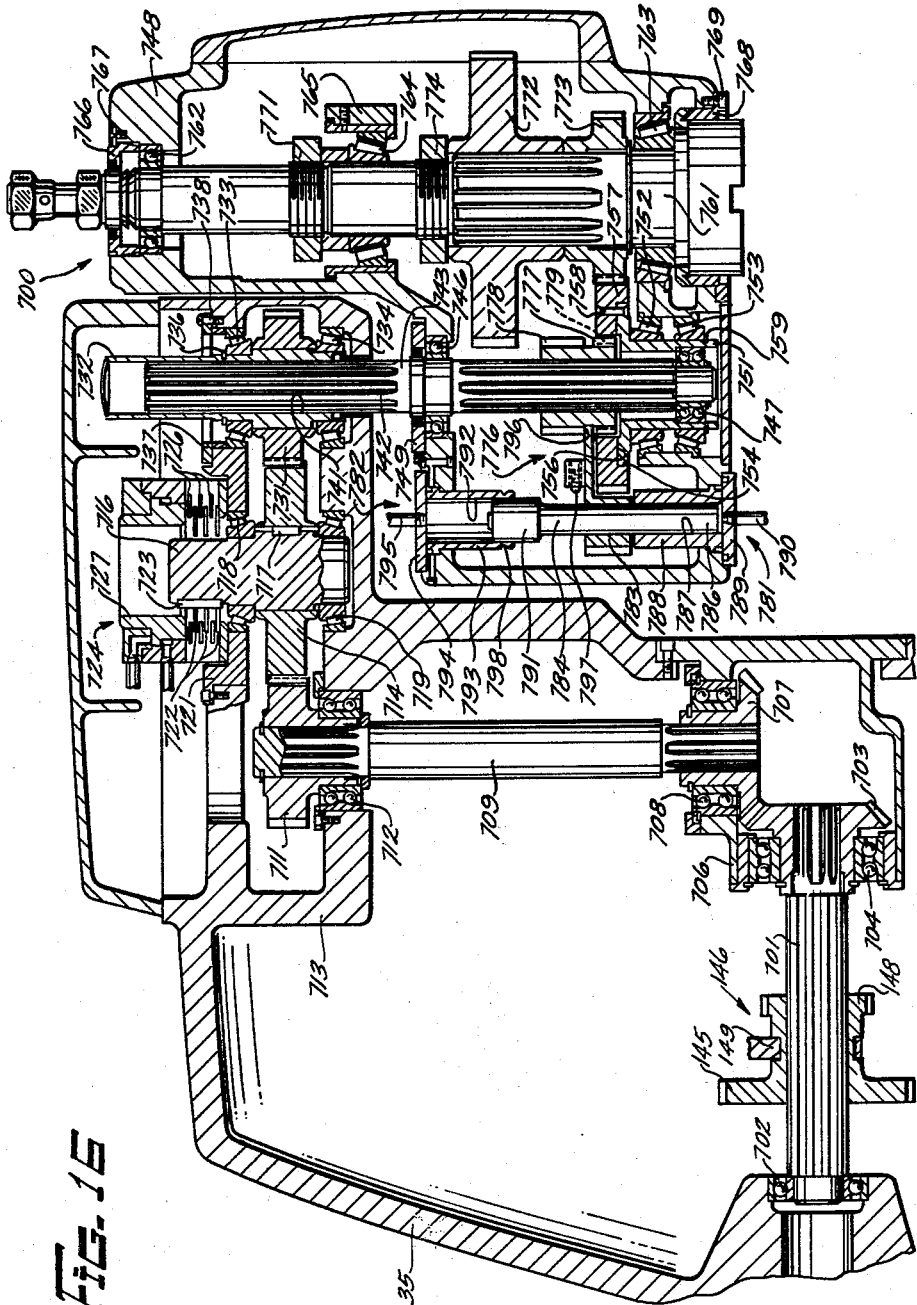
Figure 17:
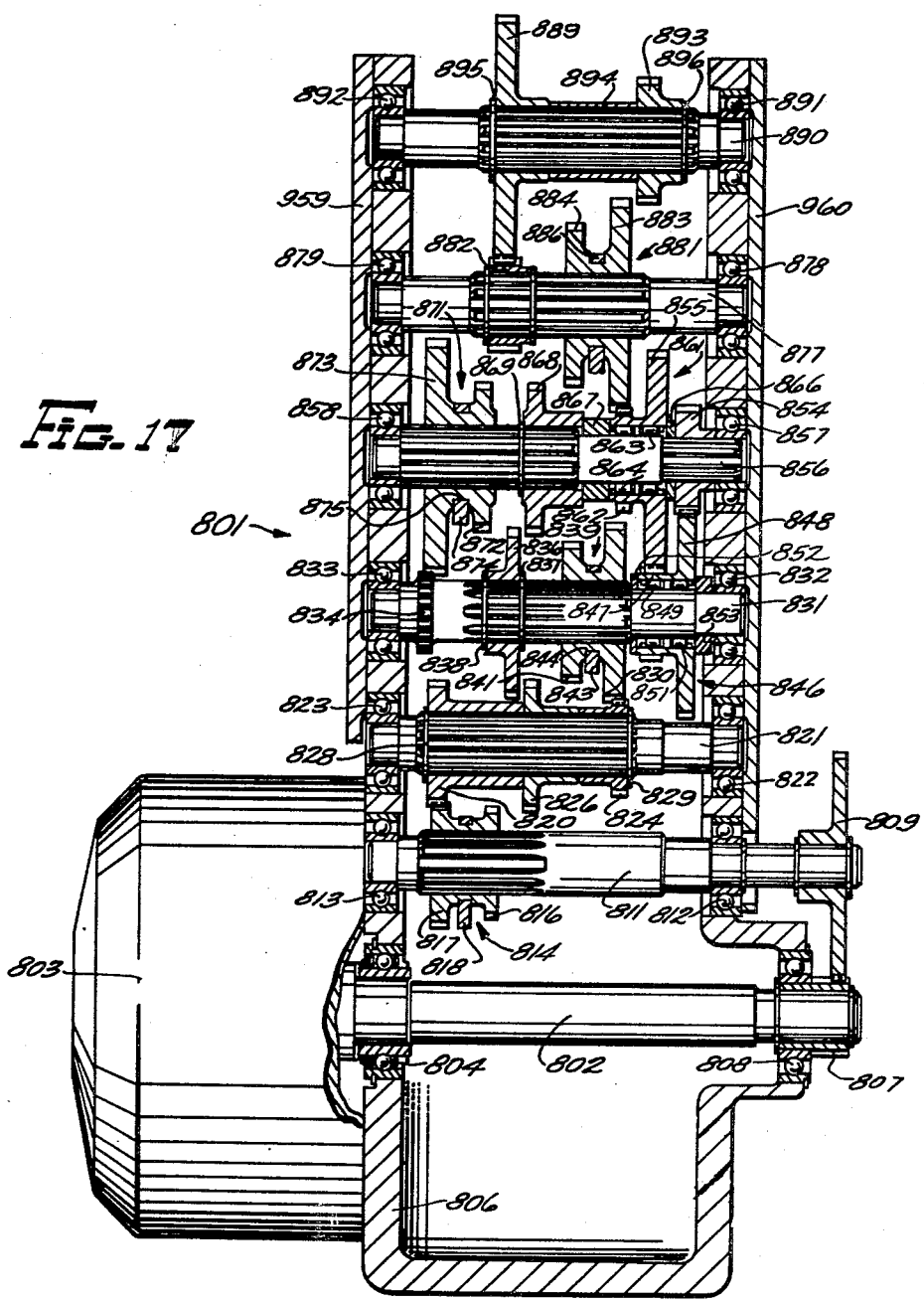
Figure 18:
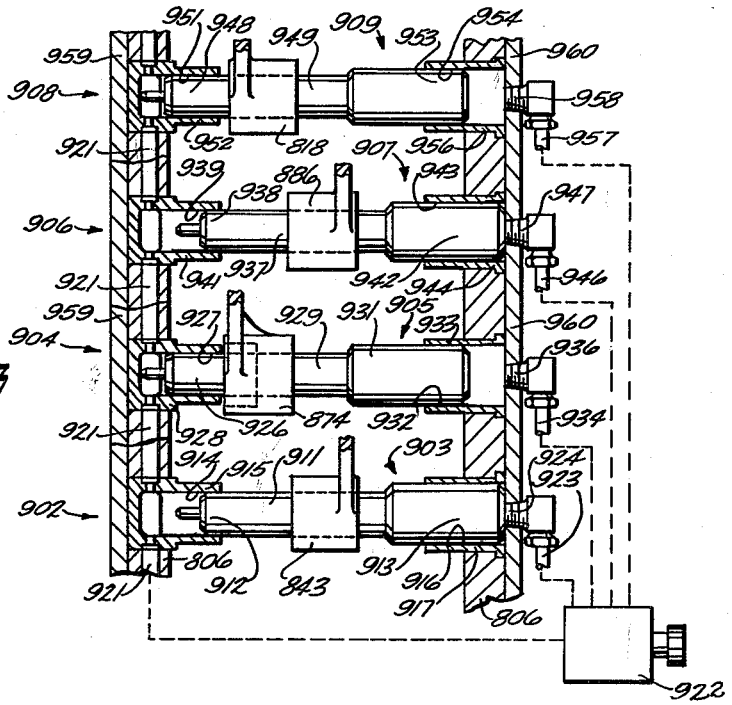

FIG. 16 is a modified form of the transmission and automatic shifting mechanism especially adapted for application to a milling machine having a vertically adjustable head, FIG. 17 is a fragmentary developed view in side elevation showing the feed change transmission of a milling machine which incorporates in a modified form of the automatic shifting mechanism applied to the speed transmission with the gears being shown one above another for the purpose of clarity in the illustration;

FIG. 18 is a fragmentary view in side elevation illustrating the power actuators and associated shafts and shifter forks that are operatively carried within the feed transmission frame.

Figure 19:
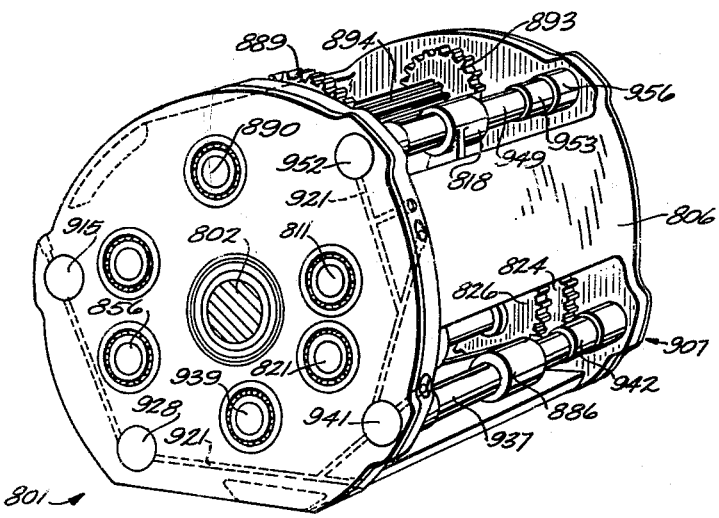
Figure 21:
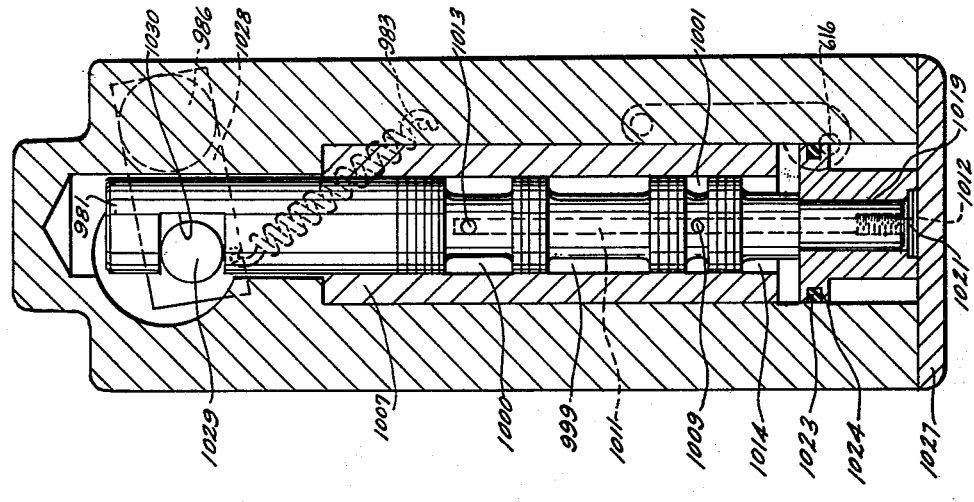
Figure 20:
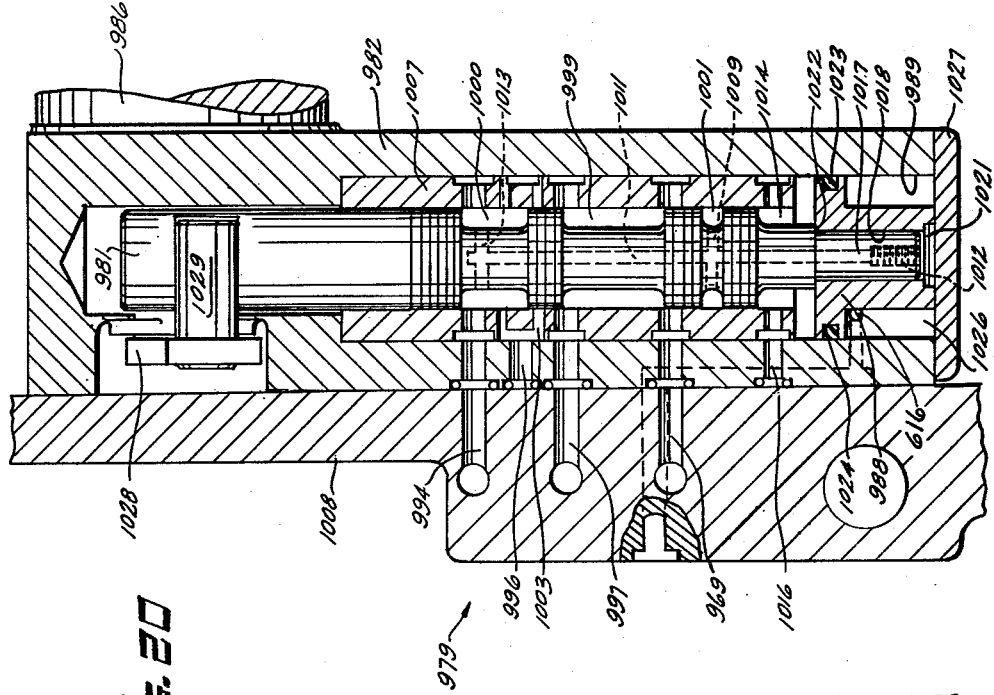

FIG. 19 is a perspective view of the feed transmission with the feed motor and front cover plate removed, illustrating the arrangement of the various shafts and power actuators in the feed transmission;

FIG. 20 is a detailed view partly in section and partly in side elevation depicting the rapid traverse valve shown diagrammatically in FIG. 15;

FIG. 21 is a view partly in section and partly in rear elevation illustrating the rapid traverse valve shown in FIG. 20;

FIG. 22 is a diagrammatic view showing the interrelationship of the mechanical operating parts constituting the power drives of a machine tool embodying the features of the present invention;

FIG. 23 is a diagrammatic view of the electrical circuit.

Figure 1:
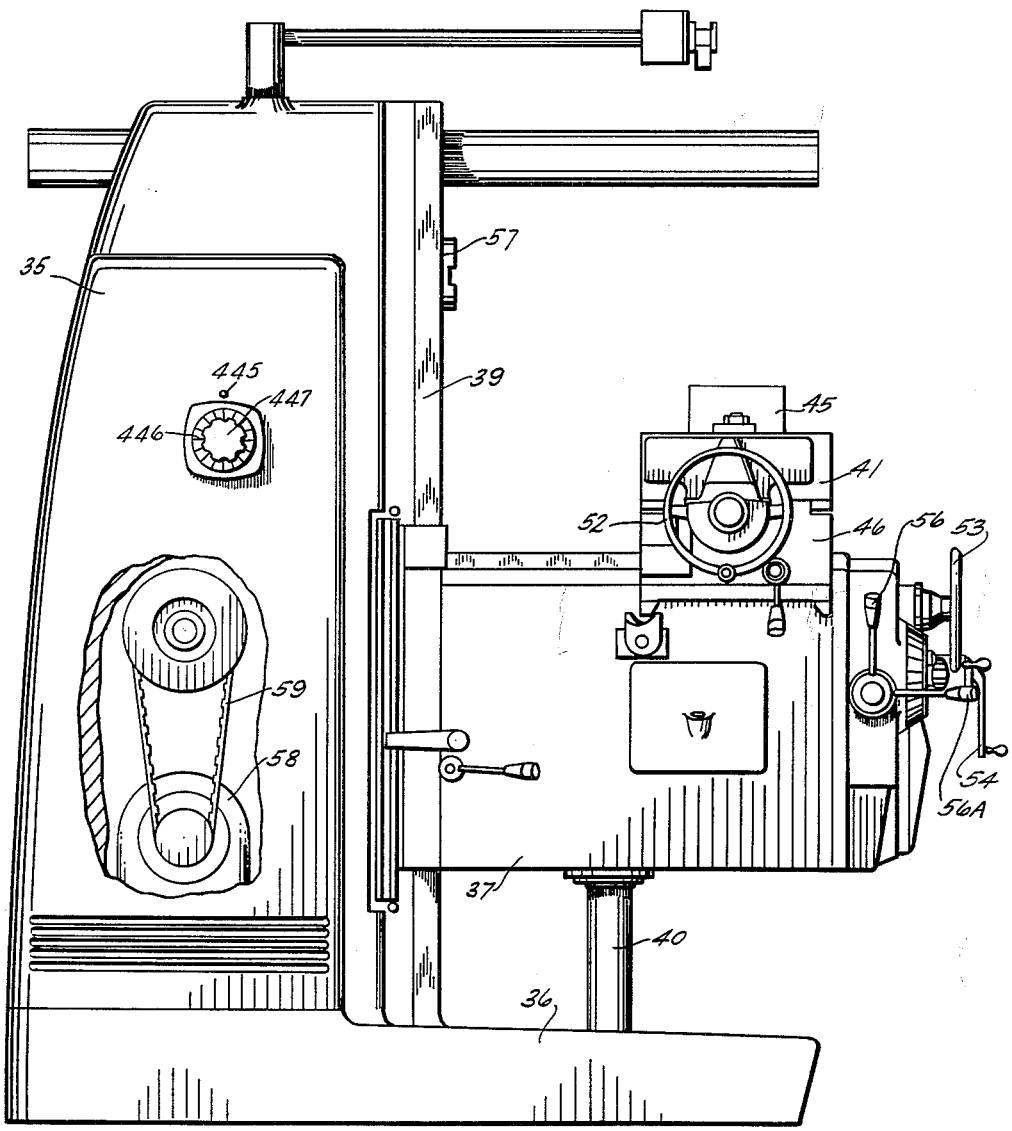
FIGURE 1 is a view in side elevation of a horizontal spindle milling machine exemplifying a machine tool in which the features of the present invention may be incorporated to advantage.

Reference is now made more particularly to the drawings and especially to FIG. 1 which illustrates a machine tool embodying the present invention. As there shown, the machine tool comprises a column 35 presenting a forwardly extending base 36. A knee 37 is slidably secured for vertical movement to way surfaces 39 presented by the column. Vertical movement of the knee 37 is effected by an elevating screw 40 having one end secured to the base 36 and the other end engaging a rotatable nut (not shown) journalled in the knee 37. A worktable 41, suitable for carrying a workpiece 45, is slidably carried by a saddle 46 which is slidably mounted on the knee 37. Horizontal translatory movement of the worktable 41 is effected by rotating a feed screw 49 which is journalled in the saddle 46 and is in meshing engagement with a nut (not shown) that is fixedly secured to the underside of the table 41. Transverse horizontal movement of the saddle 46 is effected by a screw 51, FIG. 22, and a nut (not shown). A handwheel 52 is disengageably secured to the feed screw 49 for effecting manual movement of the worktable 41. Similarly, a handwheel 53 is disengageably secured to the screw 51 for effecting manual translation of the saddle 46, as shown in FIGS. 1 and 22. Likewise, a hand crank 54 is disengageably secured to a shaft 55, FIGS. 1 and 22, for effecting vertical movement of the knee 37. In addition to the hand operated means, the table 41, saddle 46 and knee 37 are adapted to be individually displaced by power actuated means operatively connected to each. To this end, levers 56 and 56A are operative to control the power operating means for moving the saddle and knee respectively. A spindle 57 is rotatably journalled in the column 35 and adapted to carry various work tools to perform specific operations on the workpiece 45. Power for driving the spindle 57 is supplied by an electric motor 58 operatively connected to an adjustable speed transmission which, in turn, is connected to the spindle 57, thereby providing a plurality of speeds at which the spindle may be rotated.

Figure 2:
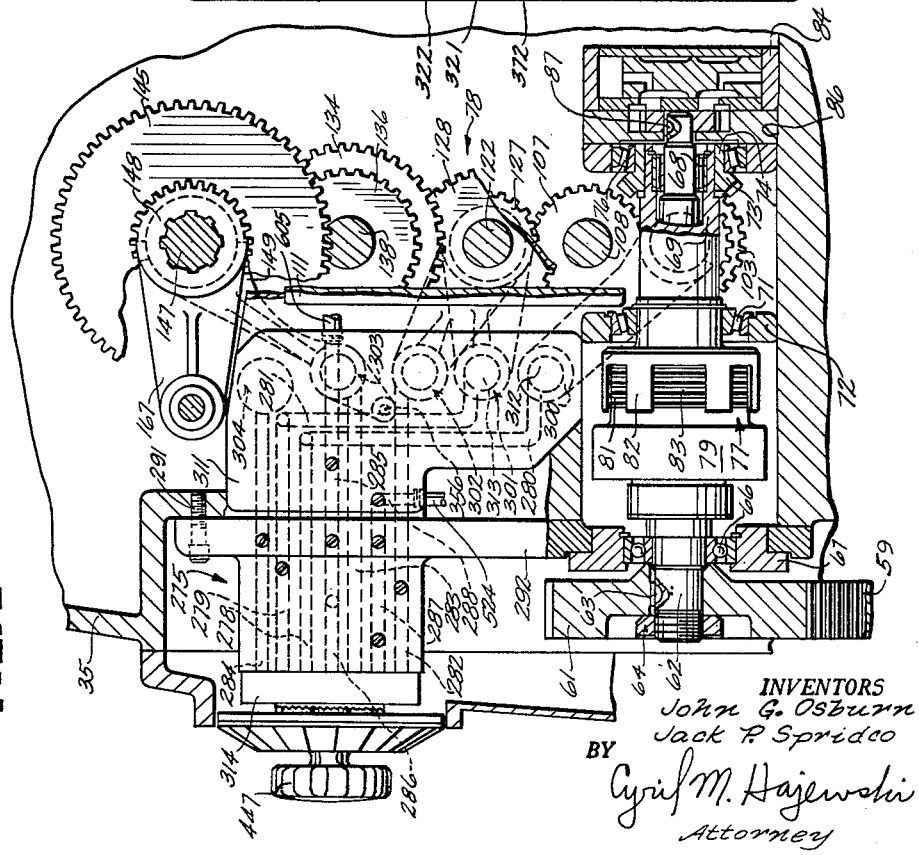
FIG. 2 is a fragmentary view in front elevation of the upper portion of the column showing the manifold and the transmission including its associated drive mechanism.

As shown in detail in FIG. 2, the spindle drive motor 58 is connected by means of a belt 59 to drive a pulley 61 keyed to a shaft 62 by a key 63 and retained on the shaft by a threaded nut 64. The shaft 62 is rotatably journalled at one end in a bearing 66 carried by a collar 67 secured to the column 35. At its opposite end the shaft 62 is journalled in a bearing 68 carried within a sleeve 69. One end of the sleeve 69 is journalled in a bearing 71 carried in a transmission frame 72 and its other end is carried within the bored opening of a bevel gear 73 having an integrally formed projecting hub 74. The gear 73 is rotatably supported with its hub 74 being carried by a bearing 76 seated within a bored opening in the column 35.

Figure 3:
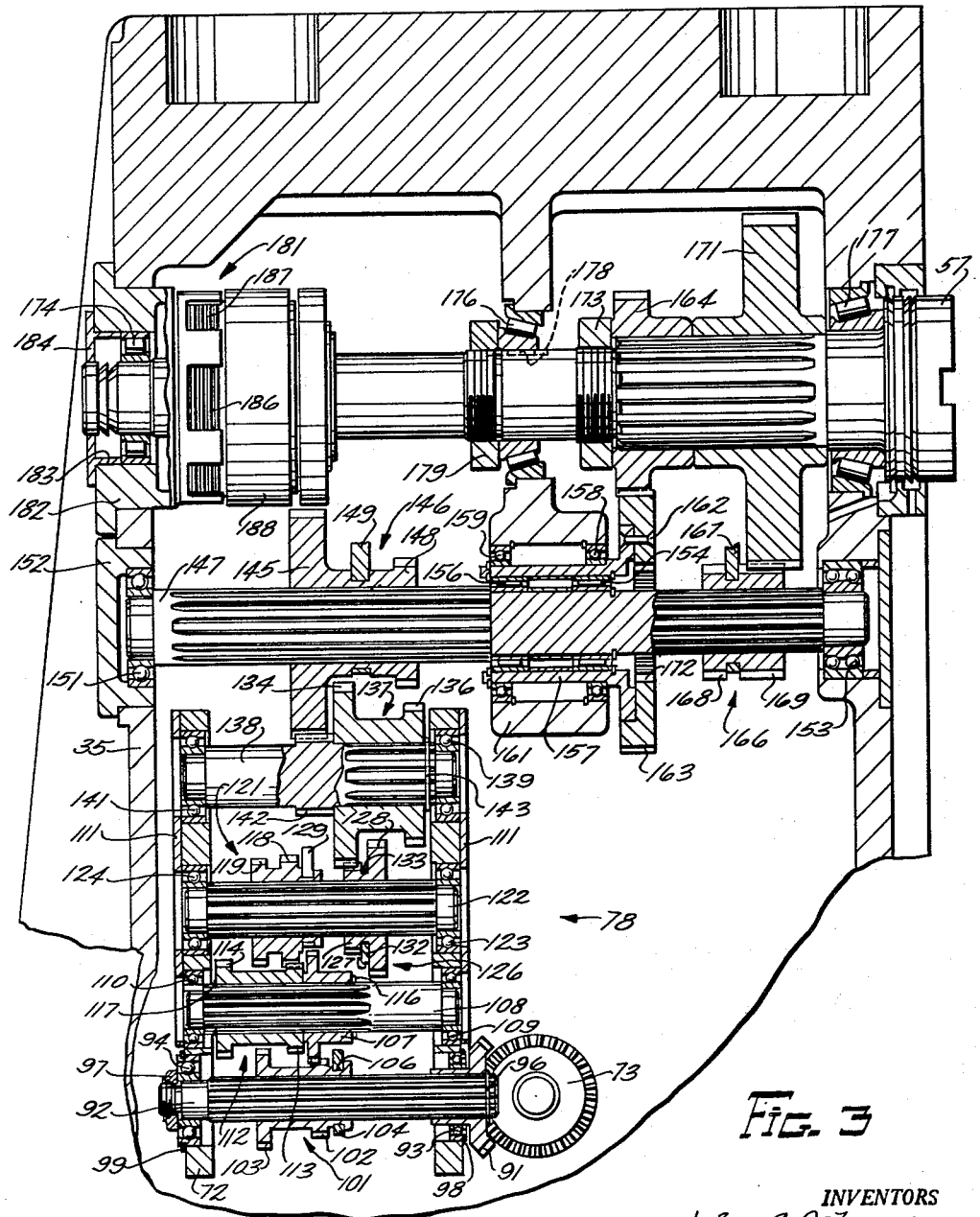
FIG. 3 is a fragmentary view in side elevation showing the speed change transmission and range change mechanism.

A hydraulically operated spindle clutch 77 is operatively connected between the shaft 62 and the sleeve 69 for selectively connecting the drive motor 58 to a speed transmission 78, illustrated in FIGS. 2 and 3. The clutch 77 comprises a clutch housing 79 secured to the shaft 62 and carrying a plurality of clutch plates 81. Integrally formed with the sleeve 69 is a sleeve housing 82 which supports a plurality of clutch plates 83 that are alternately disposed between the clutch plates secured to the housing 79. When the clutch is actuated to connect the shaft 62 with the sleeve 69, the clutch plates 81 and 83 are brought into frictional engagement to transmit power applied to the shaft 62 to the sleeve 69 in well known manner. A rotary hydraulic pump 84 of well known construction is carried within a bored opening 86 in the column 35 and is keyed to one end of the shaft 62 by means of a key 87. Since the shaft 62 is driven by the motor 58, it will be apparent that the pump 84 is operated whenever the shaft 62 is driven and its operation does not depend upon engagement of the spindle clutch 77.

The shaft 62 and sleeve 69 constitute the power input drive for the speed change transmission generally designated by numeral 78, shown in FIGS. 2 and 3. The transmission comprises a plurality of nonshiftable gears and a plurality of cooperatively shiftable gears. The shiftable gears are combined into gear couplets with each couplet comprising two gears. Each gear couplet has only two adjustably shiftable positions, so that one of the gears of each gear couplet is continuously engaging another gear in the transmission. It is therefore apparent that the shiftable gear couplets do not have a neutral position.

To drive the transmission 78, power is transmitted to the bevel gear 73 which is fixedly secured to the sleeve 69 and meshingly engages a bevel gear 91 splined to a shaft 92, as shown in FIG. 3. Gear 91 is provided with an integrally formed projecting hub and is rotatably supported by a bearing 93 carried by the transmission frame 72. In addition to being supported by the gear 91, the shaft 92 is rotatably supported at its opposite end by a bearing 94 carried by the transmission frame 72. To securely hold the shaft 92 against axial movement relative to the frame, a snap ring 96 which bears against the gear 91 is carried within an annular recess formed in the periphery of one end of the shaft. A nut 97 threadedly engages the opposite end of the shaft 92 and bears against the inner race of the bearing 94. The bearing 93 and 94 are held against inward movement relative to the frame 72 by means of snap rings 98 and 99 respectively, that are carried by an annular groove formed in the outer race of each bearing. Each snap ring extends radially to engage the outer side of the frame 72 thereby resisting inward movement of each of the bearings 93 and 94 when the nut 97 is tightened on the shaft 92.

A shiftable gear couplet 101, comprising gears 102 and 103 integrally formed with the couplet, is splined to the shaft 92 for rotation therewith. The couplet 101 is shifted axially by means of a shifter fork 104 which slidably engages an annular groove 106 in the couplet adjacent the gear 102. In FIG. 3, the gear 102 is shown in engagement with a gear 107 splined to a shaft 108 adjacent to the shaft 92 and the couplet 101 is shiftable to the right from the illustrated position to disengage the gears 102 and 107 and move the gear 103 into engagement with a gear 113 on the shaft 108. The shaft 108 is rotatably supported at opposite ends in bearings 109 and 110 carried by the spaced apart parallel walls of the transmission frame 72. A pair of plates 111 are secured to the outer faces of the parallel walls of the transmission frame 72 to retain bearings 109, 110 and shaft 108 as well as the other similarly placed bearings and shafts journalled therein in their respective positions. In addition to the gear 107, the shaft 108 carries an axially fixed gear couplet 112 comprising gears 113 and 114 integrally formed therewith. The gear couplet 112 is in splined engagement with the shaft 108 for rotation therewith. Both the gear 107 and the couplet 112 are restrained against axial movement relative to the shaft 108 by snap rings 116 and 117 seated in annular recesses formed in the periphery of the shaft 108 in spaced relationship so that the gear 107 and couplet 112 are disposed between the snap rings. In either of its two shiftably available positions, the axial movement of the couplet 101 is limited by the allowable movement of the actuating shifter fork 104. It will be noted that engagement of the gears 102 and 107 will cause the shaft 108 to be rotated at a predetermined low speed, while engagement of the gears 103 and 113 will cause the shaft 108 to be rotated at a higher speed.

Gears 113 and 114 of the couplet 112 on the shaft 108 are adapted to be engaged alternately by gears 118 and 119 comprising a gear couplet 121 slidably splined to a shaft 122 for selective shiftable movement. The shaft 122 is rotatably supported at opposite ends in bearings 123 and 124, and carries a second axially movable internally splined couplet 126 comprising gears 127 and 128. Gear couplet 121 is shifted axially along the shaft 122 by means of a shifter fork 129 that engages an annular groove 131 integrally formed in the gear couplet 121. Likewise, gear couplet 126 is moved in either direction by a shifter fork 132 engaging an annular groove 133 in the couplet. Shiftably moving the gear couplet 121 to its leftward position effects meshing engagement of the gear 119 with the gear 114 of the non-shiftable gear couplet 112 splined to the driven shaft 108.

In FIG. 3, the gear 127 of couplet 126 is shown in meshing engagement with a gear 134 which, together with a gear 136, comprises a gear couplet 137. Moving the gear couplet 126 to its rightward position effects meshing engagement between the gear 128 and the gear 136 of couplet 137. The couplet 137 is a non-shiftable gear couplet and is splined to a driven shaft 138 rotatably supported by bearings 139 and 141 carried by the spaced apart walls of the transmission frame 72. A gear 142 is integrally formed with the shaft 138 adjacent the gear couplet 137. The splined couplet 137 is restrained against rightward longitudinal movement by a snap ring 143 seated in an annular groove in the shaft 138. Leftward movement of the couplet 137 is restrained by the gear 142 which is in abutting engagement with the left end of the couplet.

The gear 142 meshingly engages a gear 145 integrally formed with a gear couplet 146. The gear couplet 146 is slidably splined to a shaft 147 and operates as a range change mechanism with the engagement of the gears 142 and 145 providing the low range of operation. A gear 148 is likewise integrally formed with the couplet 146 and is adapted to mesh with gear 134 when the couplet 146 is shifted to its leftward shiftable position for effecting the high range of spindle speeds. Axial movement of the couplet 146 is effected by means of a shifter fork 149 engaging an annular groove in the couplet. The left end of the shaft 147 is rotatably supported in a bearing 151 seated in a collar 152 carried by the column 35. Similarly, the right end of the shaft 147 is rotatably supported in a bearing 153 carried by the opposite wall of the column 35. Intermediate its ends, the shaft 147 is journalled in bearings 154 and 156 which are carried by a freely rotating hub 157. The hub 157 is rotatably mounted in bearings 158 and 159 which are carried by a fixed depending web 161 of the column 35. Fixedly secured to the hub 161 by a plurality of fasteners 162 is a gear 163 that is disposed to continuously engage a high speed driven gear 164 splined to the tool spindle 57. Disposed between the gear 163 and the bearing 153 is a gear couplet 166 slidably splined to the shaft 147 and movable axially by a shifter fork 167. The couplet 166 comprises gears 168 and 169 and is provided with an annular groove formed between gears that is engaged by the shifter fork 167. In FIG. 3, the couplet 166 is shown in its rightward position with the gear 169 meshing with a low speed gear 171 splined on the tool spindle 57. When the couplet is shifted to its leftward position, the gear 168 meshes with an internal gear 172 formed in the gear 163 to couple the gear 163 to the shaft 147 for rotation therewith to drive the tool spindle 57 via the continuously engaged gears 163 and 164 in a high speed range.

Both gears 164 and 171 are held securely on the forward or rightward portion of the external splined spindle 57 by means of a nut 173. The tool spindle 57 is rotatably supported in spaced apart bearings 174, 176 and 177. The inner race of the bearing 176 is keyed to the spindle 57 by a key 178 for rotation therewith and is engaged at one end by a nut 179 that is threaded on the spindle 57 and is adapted to cooperate with the bearings 176 and 177 to secure the spindle 57 against axial movement relative to the column 35. Tightening the nut 179 draws the rightward end of the spindle 57 into abutting engagement with the inner race of the bearing 177. To provide axial stability, the bearings 176 and 177 are carried by the web 161 and the column 35 respectively in a manner to resist the axial tightening force of the nut 179.

At the left end of the spindle 57 a spindle brake 181 is operatively connected to the spindle to selectively stop spindle rotation. The brake 181 includes a spider housing 182 that is fixedly secured to the column 35 and provided with a bored opening 183 adapted to carry the bearing 174 that rotatably supports the left end of the spindle 57. A cover plate 184 is attached to the spider housing 182 to close the end of the bored opening to exclude foreign matter from the bearing 174 and to retain the bearing 174 in position. A plurality of fixed brake disks 186 are secured to the spider housing 182 to provide the fixed resistance for braking. The spindle 57 is likewise provided with a plurality of brake disks 187 that are mounted to rotate with the spindle and are alternately disposed between the fixed disks 186. Actuation of a hydraulic unit 188 places the rotating disks 187 into frictional engagement with the fixed disks 186 to thereby produce the braking effect.

Figure 4:
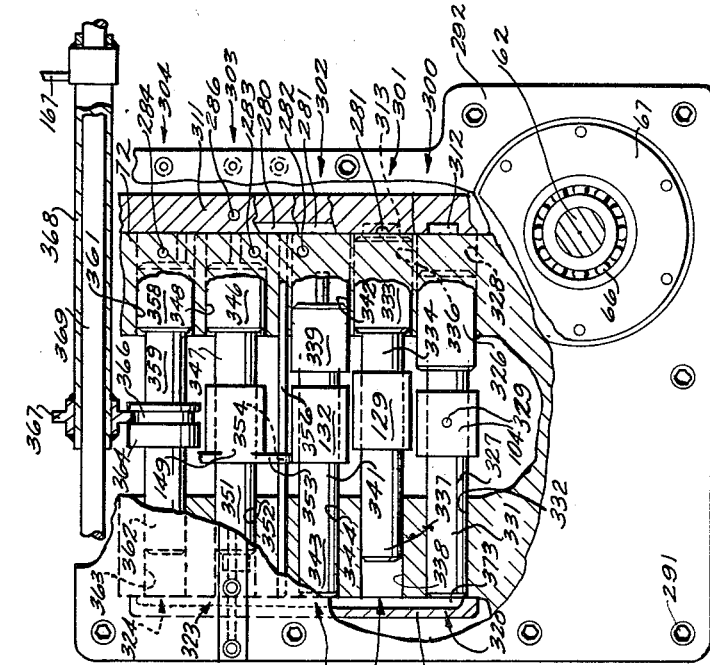
FIG. 4 is a fragmentary view showing the power actuators carried within the transmission frame for shifting the speed change transmission gears.

The shiftable gears in the speed transmission 78 are shifted to either of two shiftably adjustable positions by means of a plurality of hydraulically operated power actuators 300 to 304 inclusive, and 320 to 324 inclusive, shown in FIG. 4. Each of the power actuators comprises a piston and cylinder mechanism that is operatively carried within the transmission frame 72, as best shown in FIGS. 4 and 5. Selective actuation of the power actuators for effecting gear shifting in the transmission is under the control of a rotary control valve 275 that is constructed integrally with the transmission frame 72. The rotary control valve 275 directs pressure fluid selectively through a manifold 270, comprising lines 278 to 288 inclusive, which connect the rotary valve 275 with the power actuators 300 to 304 inclusive, as best shown in FIGS. 2 and 4 to 14, inclusive. In addition, a cover plate 311 is secured to the transmission frame 72 adjacent the manifold 270 in a manner to cooperate therewith for carrying fluid pressure between the rotary valve 275 and the power actuators. The cover plate 311, when secured to the frame 72, also closes the open ends of the power actuators 300 to 304 inclusive, as best shown in FIGS. 2, 4 and 5. The power actuators 320 to 324 simultaneously receive pressure fluid through common lines 373 and 374, as best shown in FIG. 5. Hydraulic pressure fluid from a source to be described later is transmitted to the rotary valve 275 from whence it is selectively distributed to the power actuators according to the particular angular speed setting of the rotary valve. The transmission frame 72 which supports the transmissions 78, the control valve 275, the manifold 270 and the several power actuators is secured to the column 35 by means of a plurality of bolts 291 disposed in a flange 292 integrally formed with the frame, as best shown in FIG. 4. Therefore, the transmission frame 72 and the components carried by it may be conveniently removed from the machine as a unit for service purposes by removing the bolts 291.

Figure 6:
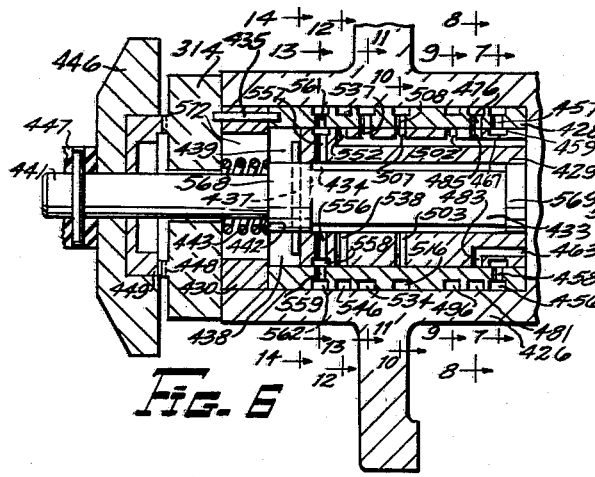
FIG. 6 is a vertical cross sectional view of the rotary control valve shown in FIG. 5 for selectively distributing pressure fluid to the power actuators shown in FIG. 4.

The manifold 270 comprising the lines 278 to 288 inclusive, is formed integrally with the transmission frame 72, with the flange 292 and a valve body 426 being likewise formed integrally with the frame 72, as best shown in FIGS. 5 through 14, inclusive. The manifold line 278 is drilled longitudinally in the valve body 426 a predetermined distance and communicates with a groove 289 in the plate 311 which, in turn, communicates with a groove 312 formed in the plate at the end of the power actuator 300, as shown in FIGS. 2, 4 and 5. Similarly, the line 279 is drilled longitudinally in the valve body 426 and joins with the groove 281 having communication with a groove 313 formed in the plate 311 at the end of the power actuator 301, as shown in FIGS. 2, 4 and 5. Manifold lines 282, 283 and 284 are drilled directly through the transmission frame 72 adjacent to the valve body 426 to connect with the sides of the power actuators 302, 303 and 304, respectively. Hydraulic pressure fluid is transmitted into the valve 275 via the inlet line 285 which is in communication with the line 285-A, both of which are drilled in the plate 311, as shown in FIG. 5, and the line 286 that is drilled longitudinally in the transmission frame 72 adjacent to the valve body 426. The lines 287 and 288, together with a line 524 shown in FIG. 15, are interlock lines between the valve 275 and the spindle clutch 77. Line 287 is drilled in the valve body 426 a predetermined depth and communicates with a line 288, drilled in the plate 311, and which is connected to the line 524, as shown in FIG. 2. To close the open ends of the drilled manifold lines 278, 279, 282, 283, 284 and 285, a cover plate 314 is secured in well known manner to the left end of the valve body 426, as shown in FIGS. 2, 5 and 6.

Referring especially to FIG. 4, it will be noted that the power actuators 300 to 304 inclusive are provided with larger diameter pistons and cylinders than those provided for the cooperating power actuators 320 to 324 inclusive, and the large diameter pistons of the power actuators 300 to 304 inclusive are formed integrally with the small diameter pistons of the power actuators 320 to 324 respectively so that they in effect constitute five differential pistons. As a result, if equal unit pressure is applied to both sides of each differential piston a shift will occur to the left as viewed in FIG. 4 by reason of the greater area of the pistons of the power actuators 300 to 304 inclusive. Thus, for example, power actuator 300 comprises a piston 326 integrally formed with a shaft or shifter rod 327; the piston being slidably supported within a cylinder 328 bored in the transmission frame 72. The shaft 327 carries the shifter fork 104 which is secured to the shaft by means of a pin 329. At the left end of the shaft 327 there is provided the corresponding power actuator 320 which is operable to move the shifting fork 104 together with the rod 327 to the right. The left end of the rod 327 extends into a cylinder 332 and is reciprocable within the cylinder to constitute a piston 331 which cooperates with the cylinder 332 to form the power actuator 320. As previously mentioned, the interconnected pistons 326 and 331 are in effect a single differential piston. As a result, if pressure fluid is admitted to power actuator 320 and the power actuator 300 is connected to exhaust the shaft 327 and fork 104 will be moved to the right. However, if pressure fluid of the same value is simultaneously admitted to both power actuators 300 and 320, the shaft 327 and fork 104 will move to the left since a greater force will be exerted by the piston 326 than by the piston 331 since the piston 326 has a larger area. In the present invention, both power actuators receive pressure of the same value from a common source with the small pistons of the actuator 320 receiving a constant pressure to continuously urge its cooperating shaft 327 to the right as viewed in FIG. 4. On the other hand, the power actuator 300 is connectable selectively, by operation of the rotary valve 275, to either the common source of pressure or to exhaust.

The remaining small power actuators 321 to 324 inclusive function in a similar manner relative to the respective large actuators 301 to 304 inclusive. Actuator 301 comprises a piston 333 integrally formed on the right end of a shaft or rod 334 with the piston 333 being axially reciprocable within a cylinder 336 formed within the transmission frame 72. The associated power actuator 321 comprises a smaller diameter piston 337 integrally formed on the left end of the shaft 334. A cylinder 338 is bored in the transmission frame 72 and adapted to slidably receive the piston 337. Intermediate the power actuators 301 and 321, the shaft 334 carries the fork 129.

Power actuator 302 comprises a piston 339 integrally formed on the right end of a shaft or rod 341 which also carries the shifting fork 132 secured thereto. The piston 339 is axially reciprocable within a cylinder 342 formed in the transmission frame 72. The actuator 322 comprises a smaller diameter piston 343 integrally formed on the left end of the shaft 341 and axially slidable within a cylinder 344 formed in the frame 72.

Power actuator 303 comprises a piston 346 formed integrally with a shaft or rod 347 having the fork 149 secured to it. The piston 346 is axially movable within a cylinder 348 formed in the frame 72. Likewise, at the left end of the shaft 347 a smaller piston 351 is integrally formed with the shaft 347. A cylinder 352 formed in the frame 72 cooperates with piston 351 to form the power actuator 323. The fork 149, which is secured to the shaft 347, is provided with a depending portion 353 having a hole 354. A rod 356, having opposite ends secured to the frame 72, slidably engages the fork 149 through the opening 354 and serves to support the fork 149 for retaining it in engagement with the gear couplet 146.

Power actuator 304 comprises a piston 358 formed integrally with a shaft or rod 359, the piston 358 being axially slidable within a cylinder 361 formed in the frame 72. The cooperating power actuator 324 comprises a piston 362 formed integrally with the shaft 359 and is slidably supported within a cooperating cylinder 363 formed within the frame 72. A collar 364 which is securely fixed to the shaft 359 is provided with an annular groove 366 formed in its periphery and adapted to receive a coupling 367 that is fixed to the left end of a tubular shaft 368. Fork 167, which engages the gear couplet 166, is fixed to the right end of the shaft 368 and in turn is axially slidable on a support rod 369, the latter being secured at its opposite ends within the column 35.

The cover plate 311, as shown in FIGS. 2, 4 and 5 in addition to providing passages for conducting fluid, seals the open ends of the cylinders 328, 336, 342, 348 and 361 to render them operative for receiving pressure fluid. Similarly, the ends of the cylinders for the power actuators 320 to 324 inclusive are sealed by a single cover plate 372. While the cover plate 311 provides the large diameter cylinders with individual connections to the control valve 275, the cover plate 372 is provided with a singular common recess or line 373 having communication with all of the small diameter power actuators and with the line 374 from the control valve 275, as shown in FIG. 5. It is therefore apparent that when pressure fluid is transmitted to the small diameter actuators it is supplied to all of them simultaneously at the same pressure. The cover plates 311 and 372 serve an additional purpose of limiting the longitudinal displacement of the pistons of the power actuators associated with each plate. Each of the shifter rods 327, 334, 341, 347 and 359 and the pistons associated therewith have only two shiftably adjustable positions, and in either position the ends of the respective pistons will abut one of the plates 311 and 372. As shown in FIG. 4, the ends of the large pistons 326, 333, 339, 346 and 358 abut the plate 311 when shifted rightwardly and the ends of the small pistons 331, 337, 343, 351 and 362 will abut the plate 372 when shifted leftwardly. It will be apparent that each shifted position of the shifter rods 327, 334, 341, 347 and 359 effects engagement of various gears to produce a predetermined spindle speed. Any combination of shifted positions of the shifter rods 327, 334, 341, 347 and 359 will be maintained until changed by actuating a different combination of power actuators.

To effectuate a gear change resulting in a change in spindle speed, hydraulic pressure fluid is selectively transmitted to the power actuators according to predetermined gear combinations for desired spindle speeds. The distribution of the pressure fluid to both the large and small diameter power actuators is controlled by means of the rotary control valve 275, as shown in FIGS. 5 and 6, which is in operative relationship with the manifold 270 as hereinbefore described. Referring to FIGS. 5 and 6 specifically, the control valve 275 comprises the valve body 426, formed integrally with the transmission frame 72 and which is adapted to carry a stationary valve sleeve 428 having a plurality of openings in its periphery. The sleeve 428 is stationary within the valve body 426 and is in communication with the lines in the manifold thereby serving as a distributor for the manifold. A rotatable valve sleeve 429 is rotatably supported within the stationary sleeve 428 and is provided with a plurality of openings that are movable therewith relative to the openings in the sleeve 428. The openings in the rotatable sleeve 429 and in the stationary sleeve 428 are spaced radially at predetermined intervals with the radial transverse axes of the openings in the rotatable sleeve being in the same plane as the axes of the cooperating openings in the stationary sleeve. Thus, by rotating the sleeve 429 selected openings in the sleeve 429 are placed in register with the openings in the sleeve 428. The rotatable sleeve 429 is maintained in its position relative to the stationary sleeve 428 by having its right end engaging the valve body 426 and its left end engaging a spacer ring 430 held in place by the cover plate 314. A pin 435 extends through the ring 430 and engages both the plate 314 and the stationary sleeve 428 to hold the sleeve in a fixed position. A valve plunger 433 is slidably carried within the rotatable sleeve 429 and is movable axially outward relative to the rotatable sleeve to shut off pressure fluid to all of the power actuators preparatory to rotating the valve sleeve 429 for establishing a different spindle speed. To disconnect the power actuators from the pressure fluid line 286, the plunger 433 is withdrawn a predetermined distance and to reconnect the actuators to a pressure or exhaust condition the plunger is re-inserted to its original position. The plunger 433 is provided with a cannelure 434 extending over the major portion of its length thereby permitting hydraulic pressure fluid to flow between the rotatable sleeve 429 and the plunger 433 for distribution to the various openings in the rotatable sleeve. A pin 437 extends through the left end of the plunger 433 and engages radial slots 438 and 439 formed in the left end of the rotatable sleeve 429. Extending leftwardly of the plunger 433 is a shaft 441 integrally formed therewith and having a diameter less than the diameter of the plunger; the plunger thereby presenting a shoulder 442 on its left end. A coiled spring 443 is carried by the shaft 441 and bears against the shoulder 442 with one end while the other end bears against the inner face of the cover plate 314 fastened to the end of the valve body 426. As shown in FIGS. 5 and 6, the spring 443 biases the plunger 433 inwardly to the right. A dial 446 and a knob 447 are fastened to the left end of the shaft 441 exteriorly of the plate 314. The dial 446 is provided with indicia corresponding to the various speeds at which the spindle is capable of being rotated and cooperates with a pointer or mark 445, shown in FIG. 1, to indicate the selected spindle speed.

To retain the control valve 275 in any selected angular adjusted position, a locking mechanism is disposed between the plate 314 and the dial 446. The locking mechanism comprises a ring 448 having teeth formed on its outer face and a cooperating ring 449 provided with teeth formed in its outer face in a manner to cooperate with each other. The ring 448 is securely fixed to the plate 314 and the ring 449 is secured to the dial 446 in operative relationship so that when the plunger 433 is biased rightwardly by spring 443, the teeth on the rings 448 and 449 are in locking engagement as shown in FIG. 5. Accordingly, the control valve 275 cannot be rotated to a different angular position without first disengaging the locking mechanism. To disengage the mechanism, the shaft 441, dial 446 and plunger 433 are displaced leftwardly by manipulating the knob 447 preparatory to selecting a new spindle speed. Upon turning the dial to the newly selected spindle speed and releasing the knob 447, the locking mechanism is re-engaged due to the rightward biasing effect of the spring 443.

Cross-sectional views illustrating the porting of the control valve 275 are presented in FIGS. 7 to 14 inclusive. They illustrate a greatly simplified valve arrangement for selectively directing pressure fluid to the power actuators. The cross-sectional views further illustrate the unit compactness of the integrally formed control valve 275 and manifold 270 with the transmission frame 72.

Figure 7:
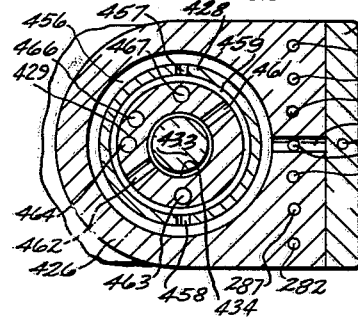

Shown in FIG. 7 is a cross-sectional view taken along the line 7—7 in FIG. 6, illustrating the passageways in the valve at a point where hydraulic pressure fluid is admitted into the valve 275. Pressure fluid flows from the drilled line 285 and 285-A in the cover plate 311 to the drilled line 286 in the manifold 270. As clearly depicted in FIG. 7, the line 286 is in communication with a line 451 having communication with an annular groove 456 formed in the periphery of the valve sleeve 428. Two radial openings 457 and 458 are also formed in the stationary sleeve 428 and are in communication with the groove 456 and an annular groove 459 formed in the periphery of the rotatable sleeve 429. Groove 459, in turn, is normally in communication with the cannelure 434 by means of radial passages 461 and 462 formed in the rotatable sleeve 429. Pressure fluid will flow from the line 286 to the line 451, to the annular groove 456 and then to the annular groove 459 via passages 457 and 458. Assuming that the plunger 433 is biased inwardly by spring 443, fluid from the groove 459 will flow through the passages 461 and 462 to the cannelure 434 from whence the fluid may flow outwardly to selected radial passages formed in spaced axial and angular relationship in the rotatable sleeve 429, as will hereinafter be described. The rotatable sleeve 429 is also provided with four longitudinally extending bored openings, 463, 464, 466 and 467 of different lengths, formed in angularly spaced relationship, and each being connected to one or more longitudinally spaced, outwardly extending radial exhaust openings formed in the rotatable valve sleeve 429 as will be presently described.

Figures 8, 9:
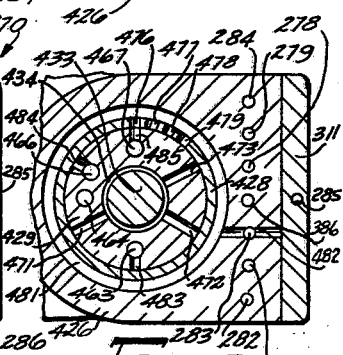

FIG. 8 is a cross-sectional view taken along the line 8—8 in FIG. 6 and illustrates the porting of the valve 275 for selectively transmitting pressure fluid to power actuator 303 shown in FIG. 4. The rotatable sleeve 429 is provided with radial passages 471, 472 and 473 with each having one end in communication with the cannelure 434 and the other end terminating at the periphery of the rotatable sleeve. In certain positions of angular adjustment of the rotatable sleeve 429, one or another of these passages is positioned to transmit pressure fluid from the cannelure 434 to radial passages 476, 477, 478 and 479 which are formed in the stationary valve sleeve 428. The passages 476, 477, 478 and 479 are in communication with an annular groove 481, formed in the periphery of the stationary valve sleeve 428. A passage 482 drilled in the valve body 426 is in communication with the groove 481 and with the line 283 that is connected at its opposite end to the large diameter cylinder 348 for the power actuator 303. The outward end of the passage 482 is sealed by the cover plate 311 to complete the pressure circuit. Of the longitudinal exhaust passages 463, 464, 466 and 467 extending through the rotatable sleeve 429, passages 463, 466, and 467 respectively are connected to radial lines 483, 484 and 485 respectively formed in the rotatable sleeve 429. With the rotary valve sleeve 428 positioned as shown in FIG. 8, passage 485 is in register with passage 476 in the valve sleeve 428 which thereby connects the power actuator 303 to drain. Pressure fluid fills the cannelure 434 and also fills the passages 471, 472 and 473. But, since none of these passages are in register with any passage in the valve sleeve 428, no pressure fluid flows thereto. Thus, with power actuator 303 connected to exhaust, the power actuator 323 at the leftward end of the shaft 347 is effective to shift the fork 149 to the right, as shown in FIG. 4.

FIG. 9 is a cross-sectional view taken along the line 9—9 in FIG. 6 and illustrates the arrangement for selectively transmitting pressure fluid to power actuator 300. Two radial passages 486 and 487 are formed in the rotatable sleeve 429 and are in communication with the cannelure 434. The stationary valve sleeve 428 is provided with radial passages 488, 489, 491, 492, 493 and 494 which are spaced radially about the sleeve and are in communication with an annular groove 496 formed in the stationary sleeve 428. A passage 497, formed in the valve body 426, is in communication with the annular groove 496 and with the lines 278 which in turn communicates with the line 280 that is connected to transmit the fluid pressure to the cylinder 328 of the actuator 300, shown in FIG. 4. Only the drain passages 464, 466 and 467 appear in FIG. 9 because the drain passages are of different longitudinal lengths within the rotatable sleeve. Since passage 463 has the shortest length it terminates prior to this cross-sectional view. Passages 466 and 467 are provided with radial passages 501 and 502 respectively adapted to register with the radial passages 488 to 494 inclusive formed in the stationary sleeve 428 at predetermined intervals upon rotation of the rotatable sleeve 429 to thereby connect the power actuator 300 to drain. With the rotary sleeve 429 in the rotary position, shown in FIG. 9, pressure fluid from the cannelure 434 flows through the passage 487, the passage 493, and the groove 496 to the passage 497. From the passage 497 the fluid flows into the line 278 and the line 280 to the power actuator 300 to shift the fork 104 to the left, as shown in FIG. 4, thereby effecting a gear change. Pressure fluid will also flow into the passage 486 but is stopped therein since that passage is not in register with any passage in the stationary sleeve 428.

Figure 10:
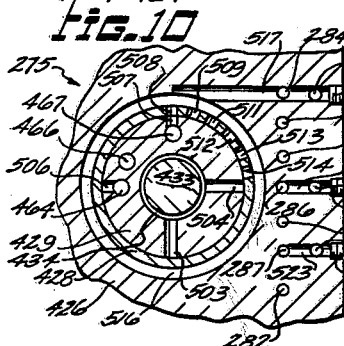

Referring now to FIG. 10, there is shown a cross-sectional view of the valve taken along the plane represented by line 10—10 in FIG. 6. As shown in this view, the rotatable sleeve 429 is provided with radial passages 503 and 504 which are in communication with the cannelure 434 and terminate at the periphery of the rotatable sleeve. The drain passages 464, 466 and 467 also extend through the plane of this cross-sectional view with the passages 464 and 467 being in communication with outwardly extending radial passages 506 and 507 respectively which are formed in the rotatable sleeve and terminate at the periphery of the rotatable sleeve. The stationary sleeve 428 is provided with radial passages 508, 509, 511, 512, 513, and 514 which terminate at the inner diameter of the sleeve 428 and also communicate with an annular groove 516 formed in the exterior periphery of the stationary sleeve. A passage 517 formed in the valve body 426 communicates with the annular groove 516, the line 284 and with a line 518. The line 518 is normally used in vertical spindle machines for shifting a range changer and for this reason is plugged when the transmission is utilized in conjunction with a horizontal spindle machine. In addition, a plug 519 is threaded into the end of the line 517 to plug the open end of the line for completing a pressure circuit. The line 284 carries pressure fluid from the passage 517 to the cylinder of the power actuator 304, as shown in FIGS. 2 and 4. Pressure fluid fills the cannelure 434 and likewise flows into passage 503 and 504 of the rotatable sleeve 429. However, at the particular valve setting shown in FIG. 10, pressure fluid is prevented from flowing to the power actuator 304 since neither passage 503 nor 504 registers with any of the passages 508, 509, 511, 512, 513 and 514 formed in the stationary sleeve 428. The sleeve passage 508, however, is in register with the passage 507 thereby connecting the power actuator 304 to the drain passage 467 by means of the line 284, passage 517 and the annular groove 516. In order to direct fluid pressure to the power actuator 304 for shifting the shaft 359 to the left as viewed in FIG. 4 it is only necessary to rotate the sleeve 429 to a position in which either the passage 503 or the passage 504 registers with any one of the passages 508, 509, 511, 512, 513 and 514. With this condition existing the pressure fluid will flow from the cannelure 434 through either 503 or 504 and through the passage 508, 509, 511, 512, 513 or 514 which is in register with either the passage 503 or 504. The flow of fluid pressure then continues through the groove 516, the passage 517 and the line 284 to the power actuator 304.

The pressure inlet line 286, as shown in FIG. 10, is connected to one end of a line 520 which, in turn, joins a line 521 constituting the major pressure supply line to the remainder of the hydraulic system. The opposite end of the line 520 is closed by means of a plug 522. Similarly, the interlock line 287 is connected to a line 523 communicating with a line 524 which is connected to the pressure inlet line of the spindle clutch 77. The outer end of the line 523 is sealed by a plug 525 to form a closed pressure line.

Figure 11:
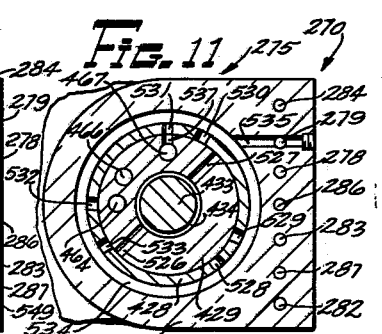

FIG. 11 is a cross-sectional view taken along the plane represented by the line 11—11 in FIG. 6 and depicts the valve portion for selectively transmitting pressure fluid to the power actuator 301, shown in FIG. 4. In this cross-sectional view the rotatable sleeve 429 is provided with radial passages 526 and 527 which communicate with the cannelure 434 and terminate at the periphery of the sleeve 429. These passages are adapted to register selectively, upon rotation of the rotatable sleeve 429, with radial ports 528, 529, 530, 531, 532 and 533 formed in the stationary sleeve 428. The ports 528 to 533 inclusive, are spaced radially at predetermined intervals in the sleeve 428 and communicate with an annular groove 534 formed in the exterior periphery of the sleeve. The annular groove 534 is in communication with the line 279 via a line 535 which has its outer end sealed by a plug. Of the passages 464, 466 and 467 extending longitudinally through the rotatable sleeve 429 only the passage 467 communicates with the periphery of the sleeve 429 through a port 537. This port 537 is adapted to register with one or another of the stationary sleeve ports 528 to 533 inclusive, to connect the power actuator 301 to drain.

With the rotary sleeve 429 revolved to the position indicated in FIG. 11 the flow of hydraulic pressure to the power actuator 301 is interrupted by reason of the fact that neither of the passages 526 or 527 is in registration with one of the stationary radial ports 528 to 533. On the other hand, the exhaust passage 467 is in communication with the passage 531 through a cooperating passage 537 so that the power actuator 301 is exhausted through the line 281, the line 279, the passage 535, the groove 534, the passages 531 and 537, and the exhaust passage 467. As a result, the constant fluid pressure in the power actuator 321 shifts the shaft 334 and its associated shifting fork 129 to the right as viewed in FIG. 4. However, the sleeve 429 may be rotated to any one of a number of rotary positions for connecting either passage 526 or 527 to any one of the stationary radial passages 528 to 533 for directing fluid pressure to the power actuator 301 for effecting a leftward movement of the shaft 334 and the shifting fork 129.

Figure 12:
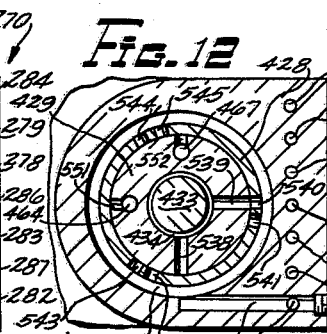

FIG. 12 depicts a cross-sectional view taken along the plane represented by the line 12—12 in FIG. 6. As there shown, the rotatable sleeve 429 has radial ports 538 and 539 which communicate with the cannelure 434 and terminate at the interior wall of the stationary sleeve 428. The stationary sleeve 428 is provided with radial ports 540, 541, 542, 543, 544 and 545 which communicate with an annular groove 546 formed in the periphery of the sleeve 428. The groove 546 is in communication with a drilled line 547 which interconnects with the drilled line 282 connected to the power actuator 302. A plug 549 is threaded into the outer end of the line 547 to form a closed pressure circuit to the power actuator 302. Drain passages 464 and 467 extending longitudinally through the rotatable sleeve 429, as indicated in FIG. 12, are each provided with radial ports 551 and 552 respectively, which terminate at the interior wall of the stationary sleeve 428. Pressure fluid flows from the cannelure 434 into the ports 538 and 539. In FIG. 12, port 539 is shown in register with port 540 in the sleeve 428 and therefore pressure will flow from cannelure 434 and port 539 through port 540 into the annular groove 546, the line 547 and the line 282 to the power actuator 302. Actuation of power actuator 302 will move the fork 132 on the shaft 341 to the left, as viewed in FIG. 4, to effect a corresponding gear change in the speed transmission. Inasmuch as port 538 is not in register with any port in the sleeve 428, there will be no flow of pressure fluid through it. Since the power actuator 302 is receiving pressure fluid at the particular valve setting illustrated in FIG. 12, it will be apparent that neither of the drain lines 464 and 467 will be in register with any of the ports in the sleeve 428 to exhaust the actuator 302.

Figure 13:
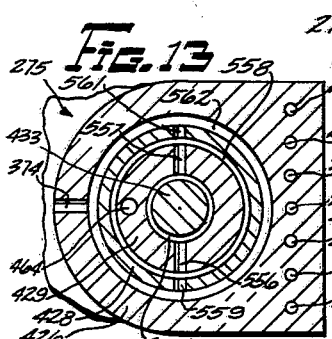

FIG. 13 is a cross-sectional view taken along the line 13—13 in FIG. 6 and illustrates the valve porting for transmitting a continuous supply of pressure fluid to all of the small diameter power actuators 320 to 324 inclusive whenever the control system is activated and the plunger 433 is in its inner position for effecting a selected shiftable adjustment. The rotatable sleeve 429 is provided with radial passages 556 and 557 which are in communication with both the cannelure 434 and an annular groove 558 formed in the periphery of the rotatable sleeve. Likewise, the stationary sleeve 428 is provided with two radial ports 559 and 561 which communicate with the groove 558 formed in the rotary sleeve and with an annular groove 562 formed in the periphery of the stationary sleeve. The groove 562, in turn, communicates with a drilled line 374 drilled in the valve body 426 and in the frame 72, as best shown in FIG. 5. Line 374 functions to supply pressure fluid for all of the small diameter power actuators. As described hereinbefore, line 374 transmits pressure fluid to the power actuator 323 from whence it is transmitted to the several small diameter power actuators 320, 321, 322 and 324 via the common line 373 so that all of these actuators are being continuously subjected to hydraulic pressure which operates to urge the pistons to the right as viewed in FIG. 4.

A line 563 branches from line 374 and joins with a line 564 which is connected to transmit fluid for lubricating various parts of the machine. Plugs 565 and 566 are threaded into the lines 374 and 564 respectively at their open ends to form closed circuit pressure lines as indicated in FIG. 5. Referring again to FIG. 13, only the drain line 464 extends longitudinally through the rotatable sleeve 429 at this point. Since pressure fluid is supplied continuously to all of the small diameter power actuators irrespective of whether or not pressure fluid is also supplied to large diameter power actuators, it is apparent that there is no need for a drain connection to the drain line 464 at any time. Therefore, the drain line 464 is not provided with a radial port for communication with the groove 558. As pressure fluid flows through the valve 275, it fills the cannelure 434 around the plunger 433 and flows out of the passages 556 and 557 into the annular groove 558 from whence it flows through the ports 559 and 561 into the annular groove 562, and into the line 374 to all of the small diameter power actuators.

Figure 14:
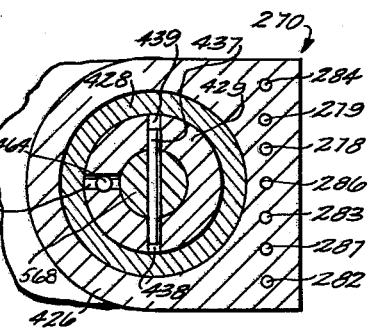
FIGS. 7 to 14 are sectional views through the rotary control valve taken generally along the planes represented by the respective figure lines in FIG. 6.

Referring to FIG. 14, there is shown a cross-sectional view of the valve 275 taken along the line 14—14 in FIG. 6. At this point the rotatable sleeve 429 is shown with the pin 437 inserted in the slots 438 and 439. With the valve plunger 433 biased inwardly as shown in FIGS. 6 and 14, an enlarged outer end 568 thereof blocks one end of a port 566 formed radially in the rotatable sleeve 429 and which is in communication with the longitudinally extending drain line 464. With this condition existing, the other end of the radial port 566 is blocked by the inner wall of the stationary sleeve 428.

Preparatory to rotating the valve 275 to effect a gear change, the plunger 433 and associated shaft 441 are pulled outwardly or leftwardly as viewed in FIG. 6. Outward movement of both the plunger 433 and the shaft 441 effects simultaneous disengagement of the locking rings 448 and 449, uncovering the port 566 by the left end of the plunger 433 and shutting off the incoming pressure fluid through passages 461 and 462 with an enlarged right end 569 of the plunger 433. The principal reason for shutting off the incoming pressure fluid through the passages 461 and 462 is to prevent unnecessary shifting movement of the shifter rod and gears as the rotary control valve is rotated through non-selected spindle speeds while being rotated to a selected spindle speed. Thus, it will be apparent that only one shift movement will take place under these conditions rather than a plurality of nonselected shift movements in addition to the shift movement necessary for the newly selected spindle speed. The principal reason for connecting the cannelure 434 to exhaust via lines 566 and 464 is to relieve the pressure within the cannelure 434 to facilitate rotating the rotary sleeve 429 by preventing binding within the valve between the rotatable sleeve 429 and stationary sleeve 428. It will be apparent from viewing FIGS. 8, 10 and 11 that an unbalanced pressure condition within the valve at this particular valve setting will result if the cannelure 434 is not connected to drain prior to rotating the rotatable sleeve. In FIG. 8, pressure fluid fills both passages 471 and 473, but since they are 180° apart the net forces exerted by the pressure fluid balance out each other. However, pressure fluid also fills passage 472 and since there is no corresponding passage opposite it, the pressure fluid will act against the stationary sleeve 428 and force the rotatable sleeve against the stationary sleeve. This creates a binding condition which will likewise occur in the valve 275 when the rotary sleeve 429 is positioned as shown in FIGS. 10 and 12. In FIG. 10, the pressure fluid in the passages 503 and 504 will act against the stationary sleeve 428 and force the rotatable sleeve 429 against the stationary sleeve since the passages do not have corresponding opposite passages to balance the forces exerted by the pressure fluid. It will be apparent that the same condition will exist in FIG. 12. Therefore, by connecting the cannelure 434 to exhaust when pulling out the plunger 433 the unbalanced pressure condition is relieved to avoid any binding within the valve 275. It is also essential that gear shifting does not occur when the transmission gears are being driven for rotating the spindle 57.

To prevent rotation of the control valve 275 whenever the spindle 57 is rotating, the valve is connected to a pressure inlet line 591 of the spindle clutch 77, as shown in FIGS. 10 and 15, via the interlock lines 287 and 524, to receive pressure fluid whenever the clutch is actuated. When the clutch 77 is actuated, pressure fluid enters the valve 275 via the line 524 and 287 and fills a chamber 572 formed between the cover 314, the spacer ring 430, the rotatable sleeve 429 and the plunger 433. The pressure in the chamber 572 acts on the shoulder 442 to retain the plunger 433 inwardly, as viewed in FIGS. 5 and 6, with sufficient force to prevent its manual withdrawal and disenagement of the locking rings 448 and 449 whenever the spindle clutch is actuated. Whenever the spindle 57 is in a stopped condition with the spindle brake 181 actuated, the chamber 572 is connected to drain via the interlock lines 287 and 524 in a manner to be subsequently described, thereby permitting withdrawal of the plunger 433 and a subsequent gear change.

After rotating the control valve 275 to a newly selected spindle speed and releasing the knob, the plunger 433 is urged inwardly by the spring 443 to cause its enlarged portion 568 to block the drain line 566 and the pressure fluid inlet passages 461 and 462 are reopened by the rightward movement of the enlarged portion 569. It will then be apparent that as the pressure fluid flows through the valve 275 it will be distributed selectively by the rotatable sleeve 429 and the stationary sleeve 428 to the power actuators to effect the gear change for the newly selected spindle speed. The gear change will take place while the transmission gears are idle. Since the transmission gears are idle, it is possible that a gear change will not be wholly completed because the ends of the gear teeth may abut each other rather than meshingly engage with each other. Actuation of the spindle clutch 77 will rotate the gears, and the abutting teeth will subsequently move into mesh. However, if the clutch is actuated instantaneously under full load an undue strain is placed on the gears that engage and possibly cause a gear failure. To reduce such undue gear strain, controlled engagement of the spindle clutch 77 is provided for to allow the unmeshed gears to engage before full load is applied.

To control engagement of the spindle clutch 77, a time delay control pressure regulating mechanism or protectomesh device 576 is incorporated in the hydraulic circuit, shown in FIG. 15, to prevent damage to the gear transmission. The time delay mechanism 576 comprises a valve spool or piston 577 slidably carried within a cylinder 578 formed in a valve body 579. A smaller valve spool or piston 581 is slidably carried within a smaller cylinder 582 formed in the valve body 579 adjacent one end of the cylinder 578. Both valve spools 577 and 581 are biased in opposite directions within their respective cylinders by a common spring 583, as shown in FIG. 15. Each of the spools 577 and 581 are provided with small diameter passages 584 and 586 respectively, extending longitudinally through each spool. The passage 584 serves as a fluid metering orifice. On the other hand the small diameter passage 586 in the spool 581 serves as a minute drain line for the chamber on the head or lower end of the spool 581 whenever the valve is returning to its initial condition. During the regulating operation of the valve the fluid which will flow through the small drain line 586 is negligible and does not effect the regulating operation of the valve. In addition, valve spool 581 is provided with a cannelure 587 formed in its periphery. Pressure fluid is admitted into the valve 576 through a conduit 585 and an inlet port 588 formed in the valve body 579 having communication with the cannelure 587. Fluid passes around the cannelure 587 and is discharged into a line 589 connected to a line 591 which carries pressure fluid to the spindle clutch 77. A branch line 592 is connected between line 589 and one end of the cylinder 578. The end of the passage 592 which communicates with the upper end of the cylinder 578 serves as an orifice which is larger than the orifice 584 and operates to restrict the flow of fluid into the upper end of the cylinder 578. The passage 592 in cooperation with the smaller diameter passage 584 operate to maintain a uniform rate of flow into the changer above the spool 577 over a wide range of temperature and viscosity variations. The difference in the flow of fluid passing through the two passages 592 and 584 urges the spool 577 downwardly against the spring 583. Another line 593 connects line 589 with the lower end of the cylinder 582. As pressure fluid flows into the lines 589 and 591 to the spindle clutch 77, a predetermined back pressure will be built up within these lines to overcome the spring pressure of the normally open spring biased clutch. As the fluid back pressure builds up, fluid will also flow into the lines 592 and 593. Fluid from the line 592 will flow into the cylinder 578 through the metering passage 592 and will flow out of the cylinder through the relatively smaller metering passage 584 and the difference in the flow of fluid passing through the two metering passages urges the spool 577 to move downwardly, as viewed in FIG. 15, against the spring 583 thereby compressing the spring. Simultaneously, fluid will flow in the line 593 and into the cylinder 582 causing the spool 581 to move upwardly against the spring 583 to overpower the spring and in doing so regulate the fluid pressure in the lines 589, 524, 591, 592 and 593. Pressure fluid will simultaneously flow through the minute passages 584 and 586 of the respective spools into a chamber 594 and be returned to the sump via a drain passage 595. As the spool 581 moves upwardly, the cannelure 587 will gradually move out of register with the line 589 thereby shutting off the flow of pressure fluid to that line. Upward movement of the spool 581 will stop approximately at the point where the cannelure ceases to be in register with the line 589. At such point, the spool 581 will then begin to move slowly downwardly and gradually bring the cannelure 587 into register with the line 589 permitting pressure fluid to again flow into the line. The spool 581 is urged downwardly by the partially compressed spring 583 because of the gradual reduction in pressure within the cylinders 578 and 582 due to the minute flow of pressure fluid in the passages 584 and 586 to the chamber 594. When the pressure fluid begins to flow in the lines 589, 591, 592 and 593 the pressure will increase correspondingly in the cylinders 578 and 582. As the pressure increases, the pressure fluid in the cylinder 578 will urge the spool 577 downwardly further, gradually compressing the spring 583 which will increase the force exerted by it on the spool 581. Since the pressure fluid will be flowing through the passage 586 relieving pressure within the cylinder 582, the spool 581 will be slowly urged downwardly to its lowermost position, as indicated in FIG. 15. Since the diameter of the spool 577 is larger than the diameter of the spool 581 and therefore presents a larger area upon which the pressure acts, the spool 577 continues to be urged downwardly compressing the spring 583 and consequently causing the spring 581 to operate to regulate the flow of fluid through the valve at an increasing pressure. As the spool 581 is gradually urged downwardly the cannelure 587 gradually becomes more fully in register with the line 589 thereby gradually increasing the pressure within the lines 589, 591, 592 and 593 until the maximum pressure is reached. When the spool 577 has reached its maximum distance of travel within the cylinder 578 a shoulder 596 integrally formed with the spool 577 will be in abutting engagement with a shoulder 597 integrally formed on the spool 581. Such engagement will maintain the spool 581 in its lowermost position to keep the cannelure 587 in full register with the line 589 to supply maximum pressure to the spindle clutch. The control pressure rise over a time period serves to engage the clutch 77 gradually. One advantage of this type of valve lies in the fact that the preset time delay interval will remain the same regardless of the change in viscosity of the hydraulic fluid.

The hydraulic circuit employed for effecting gear shifting in the transmission 78 is illustrated in FIG. 15. As there shown, the electric motor 58 is connected to drive the hydraulic pump 84 that is connected to withdraw hydraulic fluid from a sump 603 via a line 604 and transmit it under pressure into a line 605. From the line 605 pressure fluid is transmitted to a line 606, a solenoid valve 607, and the line 285. The line 606 is connected to a pressure relief valve 608 which, in turn, is connected to the sump 603 via a line 609 to return pressure fluid to the sump whenever the relief valve 608 is open. From the line 605 pressure fluid also flows through the valve 607 to the spring spindle brake 181. The solenoid valve 607 comprises a valve spool 611 which is biased leftwardly by a spring 612, as indicated in FIG. 15. A solenoid 613 is operatively connected to the valve spool 611 to urge it rightwardly whenever the solenoid is actuated. In FIG. 15, the solenoid 613 is illustrated in its de-energized condition thereby placing a line 614 drilled in the valve spool 611 in register with the line 605 and a line 615 to transmit pressure fluid to the brake 181 and to an interlock line 616 connected between line 615 and a rapid traverse valve 979 in the feed transmission. Simultaneously, the spindle clutch 77 is connected to drain via the line 591, 589, the cannelure 587, the port 588, the line 585, a line 617 drilled in the valve spool 611 and being in register wtih the line 585 and a drain line 618 terminating in the sump 603. It will be apparent that the interlock lines 287 and 524 will also be connected to drain at this time. The line 286 carries pressure fluid from the line 605 to the rotary control valve 275 for distribution to the power actuators. Pressure fluid enters the valve 275 via the line 286 and thence is distributed by the valve and supplied to the small diameter power actuators via the common line 373 as previously described. The large diameter power actuators 320 to 324 inclusive, are connected to the rotary control valve by the individual lines 280 to 284 inclusive, for selectively transmitting pressure fluid to the large diameter power actuators in the manner described.

After a predetermined spindle speed has been selected by means of the rotary control valve 275, the solenoid 613 is energized thereby moving the valve spool 611 rightwardly as viewed in FIG. 15 against the spring 612. Rightward movement of the spool 611 places a line 619, drilled in the spool 611, in register with the line 615 and 618 thereby connecting the spindle brake 181 to exhaust. The same rightward movement places a line 621, likewise drilled in the valve spool 611, in register with the lines 605 and 585 to supply pressure fluid to the spindle clutch 77 and the interlock lines 287 and 524. Thus, pressure fluid from the supply line 605 flows through the line 621 and into the line 588 to the time delay mechanism 576. Pressure fluid passes slowly through the time delay mechanism 576, as hereinbefore described, into the line 589 and thence to the line 591 that is connected to the spindle clutch 77 to thereby slowly engage the clutch. Simultaneously, pressure fluid from the line 589 also flows into the clutch interlock lines 524 and 287 to the control valve 275 to fill the chamber 572. It will be recalled that the pressure in the chamber 572 serves to prevent withdrawal of the plunger 433 to effect a shift and therefore the transmission cannot be accidentally shifted while the spindle clutch 77 is engaged. It will be apparent from the diagrammatic view of FIG. 15 that this protective feature operates automatically as the pressure fluid is transmitted to the spindle clutch 77.

The described speed transmission which is illustrated in FIG. 3 is adapted for utilization in a milling machine having a horizontal spindle 57 for receiving a cutting tool. In order to adapt this transmission for operation in a vertical spindle milling machine certain structural modifications are required as illustrated in FIG. 16 to transmit the drive to the vertical spindle. In the modified form of the transmission and automatic shifting mechanism, as shown in FIG. 16, pressure fluid is transmitted from the rotary speed selector valve 275 in the column by means of flexible lines to shift a rate changer carried within a vertically adjustable spindle head 700. The spindle head 700 is slidably secured to the forward portion of a column by way surfaces (not shown) and is connected to be moved vertically by a screw and nut translating mechanism (not shown) in well known manner. As indicated in FIG. 16, a shaft 701 carries the gear couplet 146 and is rotatably journalled at one end in a bearing 702 carried by the column 35. The other end of the shaft 701 is carried by a bevel gear 703 which is rotatably journalled in a bearing 704 and splined to the end of the shaft 701. The bearing 704, in turn, is seated in a web 706 integral with the column 35. The bevel gear 703 meshingly engages a bevel gear 707, likewise rotatably journalled in a bearing 708 carried by the web 706. A shaft 709 is provided with externally formed splines at each end and is in splined engagement with the bevel gear 707 at one end, the other end of the shaft being in splined engagement with a gear 711 that is rotatably journalled in a bearing 712 carried by a web 713 integrally formed with the column 35. The gear 711 meshingly engages a gear 714 that is secured to a stub shaft 716 by a key 717. The shaft 716 is journalled in bearings 718 and 719 carried by a support bracket 721 in the column 35 respectively. At the upper end of the shaft 716 a plurality of disc plates 722 are secured to it by means of a key 723. These discs comprise the rotating part of a spindle brake 724 and are disposed between discs 726 which are secured to a brake body 727. The brake body 727, in turn, is secured to the support bracket 721 by well known means and includes a hydraulically actuated means for actuating the brake to an engaged or braking position. To disengage the brake 724, any well known means such as springs may be employed.

The gear train to the spindle continues with the gear 714 meshing with a gear 731 fixedly secured to a tubular drive shaft 732 journalled in bearings 733 and 734 seated in the column 35. A snap ring 736 is seated in a groove formed in the periphery of the drive sleeve 732 and bears against the inner race of the bearing 733 to thereby hold the bearing 733 in a longitudinally fixed position relative to the drive sleeve. The other side of the inner race of bearing 733 bears against shoulders formed on the gear 731 and the drive sleeve 732. A clamp ring 737 is secured to the column 35 by a plurality of bolts 738 and is provided with a depending flange that bears against the outer race of the bearing 733 to maintain it in position. At the lower end of the drive sleeve 732 the upper side of the inner race of the bearing 734 bears against a shoulder formed on the gear 731 to support it. The tubular drive sleeve 732 is provided with internal splines 741 which are in sliding engagement with external splines 742 formed on a shaft 743. The shaft 743 extends downwardly into the movable head 700 that is carried for vertical displacement by mutually cooperating way surfaces (not shown) respectively formed on the head and the column 35. Within the head 700 the shaft 743 is rotatably journalled in bearings 746 and 747. The bearing 746 is seated in a frame 748 of the head 700 and is held in place by a circular collar 749 secured to the frame. Bearing 747 is carried within a tubular hub 751 which is rotatably journalled in bearings 752 and 753 seated in the frame 748. One end of the hub is provided with an integrally formed radially extending flange 754 which bears against one end of the inner race of bearing 752. The flange itself is seated in a recess 756 formed in one side of a gear 757 and is secured to the gear by a plurality of fasteners 758. The other end of the hub is provided with an annular groove adapted to carry a snap ring 759 which bears against the inner race of the bearing 747 thereby maintaining the hub in longitudinal position relative to the frame 748.

Vertically positioned in the head 700 is a rotatably supported spindle 761 journalled at opposite ends in bearings 762 and 763, and near its middle in a bearing 764. The outer races of bearings 762 and 763 are seated in the frame 748, while the outer race of bearing 764 is seated in a tubular sleeve 765 which, in turn, is carried by the frame 748. The bearing 762 is retained in position by means of a collar 766 secured to the frame 748 by cap screws 767. Likewise, the bearing 763 is held in position by a collar 768 secured to the frame 748 by cap screws 769. The central bearing 764 is held in place by means of a nut 771 threaded on the spindle 761 and having its lower end bearing against the inner race of the bearing 764.

At the lower central portion of the spindle 761, two gears 772 and 773 of a range change mechanism are splined to the spindle and are held in axial position by means of a nut 774 threaded on the spindle. Both gears 772 and 773 are provided with internally formed splines which engage external splines formed on the periphery of the spindle. The internal splines of the gear 773 engage the ends of the external splines on the spindle 761 to limit the downwardly sliding movement of the gear 773 along the spindle while the other end of the gear 773 abuts a shoulder on the gear 772. The nut 774 bears against the opposite shoulder on the hub of the gear 772 and thereby retains the gears in fixed position. The gear 773 is in constant meshing engagement with the freely rotating gear 757. In order to transmit power from the shaft 743 to the spindle 761, an axially movable gear couplet 776 is in splined engagement with the shaft 743. The gear couplet 776 comprises gears 777 and 778 integrally formed at opposite ends of the couplet. As shown in FIG. 16, the gear 777 is in meshing engagement with an internal gear 779 integrally formed with the gear 757 but the couplet 776 may be shifted to disengage the gear 77 and move the gear 778 into engagement with the gear 772. Longitudinal movement of the couplet 776 along the shaft 743 is effected by means of power actuators 781 and 782, and a shifting fork 783. The power actuators 781 and 782 are formed at opposite ends of a shaft 784, while the fork 783 is secured to the central portion of the shaft between the power actuators. Power actuator 781 comprises a piston 786 integrally formed on one end of the shaft 784 and a cylinder 787 formed in a body 788, having its lower open end closed by means of a cover plate 189. Hydraulic pressure fluid is carried to the cylinder 787 through a flexible line 790. Constructed in similar manner is the power actuator 782 which comprises a piston 791 integrally formed on the opposite end of the shaft 784 and having a larger diameter than the piston 786. Piston 791 is longitudinally movable within a cylinder 792 formed in a cylinder body 793 secured to the frame 748. The upper end of the cylinder 792 is closed by a cover plate 794 to form a chamber for receiving pressure fluid. Pressure fluid for effecting piston displacement is transmitted to the cylinder 792 via a flexible line 795.

The shifting fork 783 secured to the shaft 784 is adapted to engage a recess 796 in the gear couplet 776 for moving the couplet axially on the shaft 743 whenever the power actuators move the shaft 784. Thus, when pressure fluid is transmitted to power actuator 782, the gear 777 will mesh with the internal gear 779 thereby transmitting power from the shaft 743 to the spindle 761 by means of the gears 777 and 779, and the continually meshed gears 757 and 773. In effect, then, when the gear 777 engages the internal gar 779, it couples the shaft 43 for driving the spindle 761 in a high speed range. When the low speed range is desired, the power actuator 782 is connected to exhaust via the line 795 and the pressure fluid which is supplied continuously to power actuator 781 becomes effective to move the piston 786, shifting fork 783 and gear couplet 776 upwardly so that the gear 778 meshes with the gear 772 to transmit power from the shaft 743 to the spindle 761. When the gear 778 is so engaged, a ball and spring detent mechanism 797 secured to the shifting fork 783 engages a groove 798 formed in the outer periphery of the cylinder body 793. Such engagement of the detent mechanism serves to retain the gears 778 and 772 in mesh in the event that the pressure is reduced in the power actuator 781 which may occur when the speed selector valve 275, FIGS. 5, 6 and 14, is rotated to select a different spindle speed. It will be apparent that the omission of the detent mechanism 797 would permit the gear 778 to drop out of engagement with the gear 772 whenever the pressure in the power actuator 781 is reduced to a predetermined minimum, or connected to exhaust.

The principles of the invention applied to the speed transmission as described hereinbefore is also applicable to a feed transmission to provide selective rates of rectilinear worktable displacement. As in the speed transmission, gear changes in the feed transmission are effectuated by hydraulically actuated power actuators having only two shiftably adjustable positions.. FIGS. 17, 18 and 19 are views illustrating a feed transmission 801 incorporating such principle for effecting gear changes and which is mounted in the knee 37. As shown in FIG. 17, the feed transmission comprises a power shaft 802 operatively connected to a motor 803 and journalled at its left end in a bearing 804 seated in a transmission frame 806. The motor 803 is centrally located at one end of the transmission frame 806, and the transmission 801, together with the motor, is centrally located within the knee 37. By this arrangement heat from the motor 803 and the transmission 801 is dissipated evenly throughout the knee 37 thereby avoiding distortion of the knee that may occur from uneven distribution of heat. The opposite end of the shaft 802 is carried by a gear 807 journalled in a bearing 808 seated in the frame 806. The gear 807 engages a gear 809 secured to the end of a shaft 811 journalled in bearings 812 and 813. A slidable gear couplet 814 comprising gears 816 and 817 integrally formed in the couplet, is in splined engagement with the shaft 811 and is adapted to be moved longitudinally by a shifting fork 818 seated in a groove 819. The gear 817 is adapted to mesh with a gear 820 carried by a shaft 821 journalled at opposite ends in bearings 822 and 823 and carrying two other gears 824 and 826. The gears 820, 824, and 826 are in splined engagement with the shaft 821 and are held in longitudinally fixed position by snap rings 828 and 829 located at opposite ends of the splined section of the shaft 821. The gear 826 is disposed on the shaft 821 so that when the gear couplet 814 is shifted to its other shiftably adjustable position, the gear 816 will meshingly engage with it. Gear 824 is disposed on the shaft 821 to engage a gear 830, as shown in FIG. 17.

Disposed in operative relationship next to the shaft 821 is a shaft 831 rotatably supported at opposite ends in bearings 832 and 833 carried by the frame 806. Near the left end of the shaft 831, as viewed in FIG. 17, a gear 834 is integrally formed with the shaft. To the right of the gear 834, a gear 836 is splined to the shaft 831 and retained in a longitudinally fixed position by a pair of snap rings 837 and 838 disposed at opposite sides of the gear 836 and engaging grooves formed in the periphery of the shaft. The shaft 831 also carries a longitudinally movable gear couplet 839 which is splined to the shaft and comprises gears 830 and 841 integrally formed with the couplet. The couplet 839 is moved longitudinally along the shaft 831 by means of a shifting fork 843 disposed in a groove 844 between the gears 830 and 841. When the couplet is moved to its other shiftably adjustable position from that shown in FIG. 17, the gear 841 will mesh with the gear 826 carried by the shaft 821. The shaft 831 carries another gear couplet 846 near its right end which comprises gears 847 and 848 integrally formed with the couplet. The couplet 846 is rotatably supported for independent rotation about the shaft 831 on bearings 849 and 851. A spacer 852 is disposed at the left side of the couplet 846 and another spacer 853 is disposed between the couplet 846 and the bearing 832 to retain the couplet in an axially fixed position. The gears 847 and 848 are constantly in mesh with gears 855 and 854 respectively which are carried by a shaft 856 journalled at opposite ends in bearings 857 and 858 carried by the frame 866. The gear 854 is secured to the shaft 856 near its right end by means of splines formed on the shaft so that it will rotate with the shaft. The gear 855 is part of a two gear couplet 861 comprising the gear 855 and a gear 862, both integrally formed with the couplet. The couplet 861 is rotatably journalled for independent rotation about the shaft 856 on bearings 863 and 864. In addition, a pair of spacers 866 and 867 are disposed at opposite sides of the couplet 861 to maintain it in longitudinally spaced and fixed relationship with respect to the gear 854 and a gear 863 splined to the shaft 856. A snap ring 869 is seated in a groove in the shaft 856 and abuts the left side of the gear 868 to maintain the gear 868, spacers 866 and 867, couplet 861, gear 854 and bearing 857 in abutment with each other as disposed axially on the shaft 856. Disposed near the left end of the shaft 856 is an axially movable gear couplet 871 splined to the shaft 856. The couplet comprises gears 872 and 873 integrally formed with it and moved axially by a shifting fork 874 engaging a recess 875 in the couplet between the gears 872 and 873. In FIG. 17, the gear 873 is shown in meshing engagement with the gear 834 on the shaft 831. When the couplet 871 is moved to its other shiftably adjusted position the gear 873 is disengaged and the gear 872 meshes with the gear 836 carried by the shaft 831. Gear 862 of the couplet 861 is shown in engagement with a gear 883 carried by a shaft 877.

The shaft 877 is located adjacent the shaft 856 and is rotatably supported in bearing 878 and 879 carried by the frame 806. The shaft 877 is adapted to carry a gear couplet 881 and a gear 882, both of which are splined to the shaft 877. The gear couplet 881 comprises the gear 883 and a gear 884 integrally formed with the couplet that is adapted to be shifted longitudinally along the splined portion of the shaft 881 by means of a shifting fork 886. When the couplet 881 is moved leftwardly to its other shiftably adjusted position, the gear 884 will mesh with the gear 868 on shaft 856. The gear 882 is held in an axially fixed position relative to the shaft 877 by means of a pair of snap rings disposed in recesses in the shaft 877 at opposite sides of the gear 882. Gear 882 is in continuous meshing engagement with a fixed gear 889 that is in splined engagement with a shaft 890. The shaft 890 is journalled at each end in bearings 891 and 892 seated in the frame 806. Another gear 893 is splined to the shaft 890 and is held in axially spaced relationship with the gear 889 by means of a tubular sleeve 894 disposed between the gears 889 and 893. A pair of snap rings 895 and 896 are disposed in grooves in the shaft 890 and retain the gears 889 and 893 and the sleeve 894 in axially fixed position.

The flow of power from the motor 803 through the feed transmission 801 with the shiftable gears in the shifted positions shown in FIG. 17 effects a predetermined low r.p.m. output speed. The motor 803 drives the shaft 802 and the gear 807 secured thereto which is in engagement with the gear 809. From the gear 809, power is transmitted through the shaft 811, the engaged gears 817 and 820 and the engaged gears 824 and 830 to the shaft 831. Power from the shaft 831 continues through the engaged gears 834 and 873, the shaft 856 and the non-shiftable engaged gears 854 and 848 to the non-shiftable engaged gears 847 and 855. From the gear 855 power is transmitted through the engaged gears 862 and 883, the shaft 877 and the engaged gears 882 and 889 to rotate the shaft 890 to effect the feeding movement. When the gear couplet 881 is shifted leftwardly so that the gears 868 and 884 are engaged, the gear couplets 846 and 861 and the gear 854 have no part in transmitting power through the feed transmission. However, the couplets 846 and 861 and the gear 854 rotate whenever the shaft 856 rotates since the gear 854 is splined to the shaft 856 and engages the gear 848 which is connected to drive the gear couplet 861.

The hydraulically operated gear change mechanism for shifting the feed transmission is illustrated in FIGS. 18 and 19. It will be readily apparent that this mechanism incorporates the same principle of operation as employed in the speed transmission, shown in FIGS. 4 and 15, but is applied in a slightly modified form. FIG. 18 presents a diagrammatic view of the gear changing mechanism showing its general structure and showing a shifted position of the shafts and shifter forks corresponding to the gear engagements in FIG. 17. FIG. 19 is a perspective view illustrating the operative relationship and position of the gear carrying shafts and the shifter shafts positioned in the feed transmission frame but the motor 803 has been omitted from its location on the end of the frame 806.

Referring more particularly to FIG. 18, the shifting mechanism employs hydraulically actuated power actuators 902, 903, 904, 905, 906, 907, 908, and 909. As in the speed transmission, these power actuators comprise piston and cylinder mechanisms of two different sizes with one of each size being operatively connected to opposite ends of a shaft that carries a shifter fork. It will be noted that each of the small diameter pistons is provided with a portion having a reduced diameter to avoid interfering with the admission of pressure fluid through the side of their respective cylinders. The shifting fork 843 is secured to an axially movable shaft 911 provided with pistons 912 and 913 formed integrally with it at its opposite ends and forming a part of the power actuators 902 and 903 respectively. The piston 912 is disposed within a cylinder 914 formed within a body 915 that is carried by the transmission frame 806 and the piston 912 and cylinder 914 comprise the power actuator 902. Similarly, the piston 913 is slidably disposed within a cylinder 916 in a body 917 to comprise the power actuator 903 at the right end of the shaft 911. It will be noted that the diameter of the piston 913 is larger than the diameter of the piston 912, the difference in diameter being necessary in order to effect an axial movement of the shaft 911 to the left as viewed in FIG. 18 when the hydraulic fluid is supplied to both power actuators at the same pressure. Pressure fluid is supplied to the power actuator 902 via a common supply line 921 connected to it and having one end connected to a control valve 922. Besides supplying pressure to the power actuator 902, the line 921 simultaneously carries the same pressure to the power actuators 904, 906 and 908. Power actuator 903 is supplied with pressure fluid by a line 923 connected between a control valve 922 and an inlet port 924 as illustrated diagrammatically in FIG. 15. It will be noted that the supply line 923 supplies only the one power actuator 903 while the common line 921 carries pressure to its several associated actuators simultaneously.

Power actuator 904 comprises a piston 926 carried within a cylinder 927 formed in a cylinder body 928. The cylinder body 928 is carried by the frame 806 and is in communication with the line 921 for receiving hydraulic pressure fluid. The piston 926 is integrally formed with the left end of a shaft 929 that carries the shift fork 874. At the right end of the shaft 929 a piston 931, having a larger diameter than the piston 926, is likewise integrally formed with the shaft 929. The piston 931 is carried within a cylinder 932 formed in a cylinder body 933 fixed in the frame 806. Together, the piston 931 and cylinder 932 comprise the power actuator 905 which is adapted to receive hydraulic presure fluid via a pressure line 934 connected to the control valve 922 and to an inlet port 936 in the power actuator 905.

Power actuators 906 and 907 are connected to control the movement of the shift fork 886 that is secured to a rod or shaft 937. A piston 938, integrally formed with the left end of the shaft 937, is carried within a cylinder 939 formed in a cylinder body 941. The body 941 is secured in the frame 806 and is in communication with the line 921 to receive hydraulic pressure fluid to effect rightward movement of the piston 938. In similar manner a piston 942, having a larger diameter than piston 938, is integrally formed with the right end of the shaft 937 and is carried within a cylinder 943. The cylinder 943 is formed in a cylinder body 944 carried by the frame 806. A hydraulic pressure supply line 946 is connected to the control valve 922 and to an inlet port 947 in the cylinder body 944 for transmitting fluid to the power actuator 907.

The power actuators 908 and 909 are constructed in similar manner as the aforedescribed power actuators in the feed transmission. Power actuator 908 comprises a piston 948 formed integrally with the left end of a rod or shaft 949 and adapted to be carried within a cylinder 951 in a cylinder body 952. The cylinder 951 is in communication with the common line 921 to receive pressure fluid for actuating power actuator 908. At the right end of the shaft 949 a piston 953 is integrally formed with it and is slidably carried by a cylinder 954 formed in a cylinder body 956 secured in the frame 806. The piston 953 and cylinder 954 comprise the power actuator 909 which is supplied with hydraulic pressure fluid via a pressure line 957 connected to the control valve 922 and to an inlet port 958 in the power actuator. The shift fork 818 is secured to the shaft 949 and is moved longitudinally in either direction by selective actuation of the power actuators 908 and 909.

To assist in retaining the cylinder bodies 915, 928, 941 and 952 in their respective positions in the transmission, a backup plate 959 is secured to the transmission frame 806 and in abutment with the ends of the cylinder bodies as well as with the ends of the bearings 823, 833, 858, 879 and 892, as shown in FIG. 17, to retain them in the frame 806. Likewise, on the right side of the transmission a backup plate 960 is secured to the frame 806 and abuts the bearings 812, 822, 832, 857, 878 and 891 to retain them within the frame 806. In addition, the plate 960 serves as an end cover for the cylinder bodies 917, 933, 944 and 956 and also contains the inlet ports 924, 936, 947 and 958 for the power actuators 903, 905, 907 and 909, respectively.

The hydraulic system for selectively operating the feed transmission and associated clutches is diagrammatically illustrated in the upper part of FIG. 15. As there shown, the electric motor 803 is operatively connected to a hydraulic pump 966 that is connected to withdraw hydraulic fluid from a sump 967 via a line 968. From the pump 966 pressure fluid is transmitted via lines 969 and 970 to the control valve 922. The control valve 922 is similar in construction to the control valve 275 and is operable in like manner for directing hydraulic pressure fluid to the power actuators 902 to 909, inclusive. Thus, pressure fluid flows through the valve 922 and is directed continuously to the small diameter power actuators 902, 904, 906 and 908 via the common line 921. On the other hand, pressure fluid is transmitted selectively to the large diameter power actuators 903, 905, 907 and 909 via the individual lines 923, 934, 946 and 957 respectively by opeartion of the control valve 922. It will be apparent that since the control valve 922 operates similarly to the control valve 275, the large diameter power actuators can be selectively actuated by the control valve 922 in any desired combination to effect a desired rate of feed.

A branch line 971 is connected to the line 969 to permit excess pressure fluid to be returned to the sump 967 through a pressure relief valve 972 and a line 973. In addition to supplying pressure fluid to lines 970 and 971 the line 969 is connected to transmit pressure fluid to a rapid traverse control valve 979.

The control valve 979 comprises a valve spool 981 which is longitudinally slidable within a valve body 982 and biased rightwardly, as shown in FIG. 15, by a spring 983. A rod 984 is connected between the left end of the spool 981 and a lever 986 for manual control of the valve spool 981. The right end of the spool 981 abuts a rod 987 which is connected to a piston 988 carried within a cylinder 989. Thus, when the piston 988 is moved leftwardly to its position shown in FIG. 15, it moves the valve spool 981 to its central position. Further leftward movement of the spool 981 is effected by moving the lever 986 in a predetermined direction. The line 616 is connected to the cylinder 989 to transmit pressure fluid to it from the line 615 whenever the spindle brake 181 is actuated as previously described. It will be apparent then that the line 616 serves as an interlock line between the speed transmission hydraulic control circuit and the feed transmission hydraulic control circuit.

The valve spool 981 is provided with a plurality of drilled lines for selectively transmitting pressure fluid to a rapid traverse clutch 992 and a feed clutch 993. In FIG. 15 the valve spool 981 is shown in a neutral position thereby connecting both clutches 992 and 993 to drain. The rapid traverse clutch 992 is connected to the sump 967 via a line 994, a passage 995 in the valve spool 981 and a drain line 996. The feed clutch 993 is likewise connected to drain via a line 997 and a passage 998 in the spool 981 that joins the passage 995. When the valve spool 981 is moved to its rightwardly shiftable position the feed clutch 993 is actuated and the rapid traverse clutch is connected to drain. Pressure fluid is transmitted to the feed clutch 993 from the line 969 via a passage 999 in the spool 981 and the line 997. Simultaneously, a passage 1000 is in register with the lines 994 and 996 to connect the rapid traverse clutch 992 to drain. When the valve spool 981 is shifted to its leftward position the rapid traverse clutch 992 is actuated and the feed clutch 993 is connected to drain. The rapid traverse clutch 993 receives pressure fluid from the line 969 via a passage 1001 in the spool 981 and the line 994. At the same time, a passage 1002 is in register with the lines 997 and 996 to connect the feed clutch 993 to drain.

It will be assumed that initially the machine tool motors 58 and 803 are actuated and the solenoid 613 is deactuated. Due to the fact that the pumps 84 and 966 are connected to the motors 58 and 803 respectively, they will operate constantly to supply pressure fluid throughout their respective hydraulic systems. With the solenoid 613 de-energized, the valve spool 611 is biased leftwardly by the spring 612, as shown in FIG. 15. The line 614 is then in register with the lines 605 and 615 to transmit fluid to the spindle brake 181 and to the cylinder 989 via the line 616. Simultaneously, the line 617 in the valve spool 611 is in register with the lines 585 and 618 thereby connecting the spindle clutch 77 to drain via the lines 591 and 589 and cannelure 587. Likewise, the chamber 572 will be connected to drain via the interlock lines 287 and 524, line 589, cannelure 587 and lines 588, 617 and 618. Pressure fluid from line 605 will flow into the valve 275 via the line 286 and be distributed to the small diameter power actuators via the common line 373. The large diameter power actuators receive pressure fluid via the lines 280 to 284 inclusive, according to the selected spindle speed as hereinbefore described. It will be noted that since the chamber 572 is connected to drain, it is possible to rotate to control valve 275 to any desired spindle speed.

Pressure fluid entering the cylinder 989 from the line 616 urges the piston 988 leftwardly to displace the valve spool 981 to its neutral position which is indicated in FIG. 15. In this position, pressure fluid is blocked from entering the valve 979 but does flow to the control valve 922 via the line 970. From the control valve 922 pressure fluid is distributed to the small diameter power actuators via the common line 921 and distributed to the large diameter power actuators via the lines 923, 934, 946 and 957, selectively, according to the particular control valve setting. Movement of the lever 986 to effect leftward movement of the spool 981 will effect actuation of the rapid traverse clutch 992. Pressure fluid will then flow from the line 969 through the passage 1001 to the line 994 connected to the rapid traverse clutch 992. Simultaneously, the feed clutch 993 is connected to drain via the line 997, the passage 1002 in the valve spool 981 and the drain line 996 terminating in the sump 967. Releasing the lever 986 will return the spool 981 to the neutral position due to the biasing effect of the spring 983.

Movement of the lever 986 in the opposite direction effects a feeding movement by moving the spool 981 and the piston 988 rightwardly in opposition to pressure fluid acting on the piston. It is to be emphasized that to effect this feed rate movement without the spindle rotating, it is necessary to overcome the force of the pressure fluid acting on the piston 988. Rightward movement of the valve spool 981 places the passage 1000 in register with lines 994 and 996, thereby connecting the rapid traverse clutch to drain. At the same time the passage 999 is placed in register with the lines 969 and 997 to supply pressure fluid to the feed clutch 993 thereby effecting feeding movement of the worktable 41. Releasing the lever 986 will return the valve spool 981 to neutral position due to the biasing effect of the pressure fluid acting on the piston 988 in opposition to the biasing effect of the spring 983. When the spool 981 is returned to the neutral position, both the feed and rapid traverse clutches are again connected to the drain line 996 via the passages 995 and 998.

For the purpose of this description, a second condition is assumed wherein the solenoid 613 is actuated, thereby displacing the valve spool 611 rightwardly to connect the spindle clutch 77 to receive pressure fluid and connect the spindle brake 181 to exhaust. Pressure fluid will flow from the line 605 through the line 621 and 588 to the cannelure 587 in the time delay valve 576. From the cannelure 587 fluid will flow into the lines 589, 591, 592, 593 and 524. The fluid in the line 591 will flow to the clutch 77 to actuate it thereby imparting rotary movement to the spindle 57. The fluid in the lines 592 and 593 will actuate the time delay valve 576, and the fluid in the line 524 will flow to the line 287 and thence to the chamber 572 to maintain the plunger 433 in a locked position as hereinbefore described. Pressure fluid from the line 605 will flow into the line 286 to the control valve 275 to be distributed to the power actuators according to the particular spindle speed valve setting. Simultaneously, the spindle brake 181 will be connected to drain via the line 615, 619 and 618. Likewise, the cylinder 989 will be connected to drain via the line 616, 615, 619 and 618. With the cylinder 989 connected to drain, the spring 983 simultaneously urges the valve spool 981 rightwardly thereby actuating the feed clutch 993. Pressure fluid will then flow from the line 969 through the passage 999 and the line 997 to the feed clutch 993. At the same time the passage 1000 will be in register with the lines 994 and 996 connecting the rapid traverse clutch to drain. Pressure fluid will also flow from the line 969 through the line 970 to the control valve 922 from whence it is distributed to the power actuators according to the selected feed rate determined by the valve setting.

Movement of the lever 986 to rapid traverse position displaces the valve spool 981 leftwardly in opposition to the spring 983. Pressure fluid will then flow from the line 969 through the passage 1001 and the line 994 to actuate the rapid traverse clutch 992. Simultaneously, the feed clutch 993 will be connected to drain via the line 997, the passage 1002, and the line 996. Upon releasing the lever 996, the valve spool 981 is automatically urged rightwardly to the feed position by the spring 983 since the cylinder 989 is connected to drain and thus there is no pressure fluid acting on the piston 988 in opposition to the spring when the clutch 77 is engaged for driving the spindle. Thus, the feed clutch 993 is reactuated and the rapid traverse clutch 992 is again connected to drain.

FIG. 15A is a chart illustrating the various pressure and exhaust conditions in the large diameter power actuators 301 to 304, inclusive, for each angularly adjustable setting of the control valve 275. A cross in the appropriate square of the chart in FIG. 15A indicates that the large power actuator which that square represents is connected to receive fluid pressure to effect a shifting movement against the force applied by the associated small power actuator. The absence of a cross in a square indicates that the large power actuator which it represents is connected to exhaust. To obtain each successive speed as listed from top to bottom in the chart, the control valve must be rotated counterclockwise, as viewed in FIG. 1. It will be noted that this is for illustrative purposes only to correlate the chart with successive valve rotation; the valve being equally angularly adjustable in a clockwise direction. As described hereinbefore, the pressure and exhaust condition applicable to each large diameter power actuator is dependent upon the particular angular setting of the control valve 275 which selectively directs pressure fluid to the power actuators by predetermined selective alignment of the fluid communicating lines, annular grooves and passages within the valve. By this arrangement, all or any combination of the large diameter power actuators are connected to either exhaust or to receive pressure fluid while all the small diameter power actuators are simultaneously connected to receive pressure fluid, there being no exhaust condition for the small diameter power actuators corresponding to that of the large diameter power actuators. For example, in the particular valve setting shown in FIG. 6, the large power actuators 301, 303 and 304 are connected to exhaust and all the small diameter power actuators are connected to receive pressure fluid. This condition or angular valve setting for rotating the spindle at twenty r.p.m., is shown in the chart, FIG. 15A, and the gears that will be in engagement to obtain this speed are shown in the shiftably engaged position in FIG. 3.

The rapid traverse valve 979 shown diagrammatically in FIG. 15 is illustrated in detail in FIGS. 20 and 21. As there shown, the valve spool 981 is slidably carried for longitudinal movement within a stationary valve sleeve 1007 mounted in the valve body 982. The valve body 982, in turn, is fixedly secured to a manifold 1008 containing the lines 969, 994, 996 and 997 which are adapted to register with passages in the valve body and the valve sleeve 1007. The valve spool 981 is provided with a plurality of cannelures adapted to register selectively in predetermined relationship with the lines 969, 994, 996 and 997. Since the valve 979 is shown diagrammatically in FIG. 15, it is not convenient to adapt all the numerals there applied to it to the detail showing of FIG. 20. However, as many numerals as practical are retained in FIG. 20 to identify corresponding parts. To this end, the valve spool 981 is provided with the passage 1000 formed in its periphery and adapted to selectively register with the lines 994 and 996. The passage 999 is formed near the central portion of the valve spool 981 and is adapted to selectively register with the lines 969, 997 and 996. Another passage 1001 is formed in the periphery of the spool 981 and is adapted to selectively register with the line 969. A line 1009 communicating with the passage 1001 is drilled transversely within the spool 981. Line 1009 communicates with a line 1011 drilled longitudinally within the spool 981 and is sealed at one end by a plug 1012 to form an operative pressure line. The line 1011 in turn joins with a line 1013 drilled transversely in the spool 981 and communicating with the passage 1000. A passage 1014 is formed in the periphery of the valve spool 981 at its lower central portion and is adapted to register with a drain line 1016. A portion 1017 of the lower end of the valve spool 981 is provided with a reduced diameter that slidably engages a bored opening 1018 in the piston 988. The reduced portion 1017 is provided with a flat surface 1019, FIG. 21, to permit withdrawal of it by relieving the negative pressure created within the bored opening that is closed at one end by a plug 1021. The piston 988 is longitudinally movable within the cylinder 989 and disposed to butt against a shoulder 1022 formed by the reduced portion 1017. An elastic O-ring 1023 is carried within an annular groove 1024 formed in the periphery of the piston 988 and serves to prevent leakage of hydraulic pressure fluid around the piston. The piston 988 is provided with a reduced diameter at one end so as to form an annular chamber 1026 for receiving pressure fluid from the line 616 which is in register with it. A cover plate 1027 is secured to the lower end of the valve body 982 to close the open end of the cylinder 989 to form the chamber 1026.

The valve spool 981 is operatively connected to the lever 986 via a link 1028 having one end fixedly secured to the rotatably mounted lever 986, as shown in FIG. 21. A pin 1029 is fixed to the opposite end of the link 1028 in a plane perpendicular to the plane of the link in position to engage a notch 1030 in the spool 981. Rotation of the lever 986 thereby effects longitudinal movement of the spool 981 by means of the link 1028 and the pin 1029 to control actuation of the feed and rapid traverse clutches.

Referring to FIG. 20, the valve spool 981 is shown in the normal operating position for continuous feed operation of the worktable 41. Hydraulic pressure fluid from the line 969 flows through the passage 999 in the periphery of the spool 981 and is discharged from the valve via the line 997 to actuate the feed clutch 993. At the same time the rapid traverse clutch 992 is connected to drain via the line 994, the passage 1000, and the line 996. Likewise, the cylinder 989 is connected to drain via the line 616, and the passage 1014 at the lower central end of the spool 981 is connected to drain via the line 1016.

To illustrate the operation of the valve 979, assume a condition wherein spindle rotation is stopped by de-energizing the solenoid 613 thereby applying the spindle brake 181 by connecting the line 615 to the pressure supply line 605, as is the condition shown in FIG. 15. Pressure fluid will then flow into the line 615 to the spindle brake 181 and also to the line 616 into the cylinder 989 to move the piston 988 upwardly. Since the spool 981 is abutting the piston 988 at the shoulder 1022 at the beginning of this piston movement, the spool will likewise be moved upwardly with the piston 988 and be placed in the neutral position thereby stopping feeding movement. The valve spool 981 will then block the pressure line 969 and simultaneously connect the lines 994 and 997 to drain line 996 via the passages 1000 and 999, respectively which will then overlap a port 1003 that is formed in the stationary sleeve 1007 and which communicates with the drain line 996. From the neutral position, rapid rate is effected by rotating the lever 986 to lift the valve spool 981 to its upper limit of travel. This will place the passage 1001 in the spool 981 in register with the line 969 and the passage 1000 out of register with the drain line 996 while the line 997 will remain connected to drain via the passage 999. Pressure fluid will flow from the line 969 into the passage 1001 and then into the line 1009 drilled in the spool 981. From the line 1009 the pressure fluid continues to flow into the line 1011 drilled longitudinally in the spool 981 to the line 1013. Pressure fluid passes through line 1013 into the passage 1000 and then into the line 994 to actuate the rapid traverse clutch 992. Releasing the lever 986 urges the spool 981 to the neutral position due to the biasing effect of the spring 983 and thereby terminates rapid rate movement of the worktable 41.

From the neutral position, feed rate is initiated by manually moving the lever 986 to move the valve spool 981 longitudinally downward. To effect feed rate when the spindle brake 181 is applied, as is the condition shown in FIG. 15, sufficient effort must be applied to the lever 986 to overcome the force exerted against the valve spool 981 by the pressure fluid acting on the piston 988 which is in abutting engagement with the spool. When the spool 981 and the piston 988 are moved to the lower limit of spool travel, pressure fluid flows from the line 969 through the passage 999 to the line 997 to actuate the feed clutch. Simultaneously, the line 994 from the rapid traverse clutch is connected to a drain line 996 via the passage 1000. By releasing the lever 986, the spool 981 is automatically returned to the neutral position due to the biasing effect of the hydraulic pressure fluid on the piston 988 which causes the piston and the spool 981 to move upwardly until the piston reaches its upper limit of travel by abutting the stationary sleeve 1007.

Thus, the movable members of the machine may be actuated at either a rapid traverse rate or a feed rate by manipulation of the lever 986 even though the spindle is idle to facilitate maneuvering the movable members into a desired position. The handles 56, 56A and a handle 1074 (FIG. 22) will operate to produce the feeding movement of the saddle 46, the knee 37 and the table 52 respectively, when the spindle is being rotated, but will not effect a feeding movement when the spindle is idle because the feed clutch 993 will be disengaged. However, the desired movement at a feed rate may be obtained when the spindle is idle by positioning the control handle 56, 56A or 1074 for selecting the desired movement and then pivoting the lever 986 to shift the valve spool 981 against the pressure on the piston 988. The same movement may be effected at a rapid traverse rate by pivoting the lever 986 in the opposite direction.

A diagrammatic view of the interrelationship of the operative elements of a vertical spindle milling machine is shown in FIG. 22. As there shown, the power train for driving the spindle 761 includes the motor 58 operatively connected to the transmission 78. The power output from the transmission 78 drives the shaft 701 and the bevel gear 703 secured to one end of the shaft. Gear 703 meshes with the bevel gear 707 secured to one end of the shaft 709. The gear 711 is secured to the opposite end of the shaft 709 and meshes with the gear 714 secured to the stub shaft 716. Gear 714 meshingly engages the gear 731 secured to the drive sleeve 732 which is slidably splined to the shaft 742. The gear 757, carried by the shaft 742, is independently rotatable with respect to the shaft and is in continuous meshing engagement with the gear 773 secured to the spindle 761. Gear couplet 776, comprising gears 777 and 778 which constitute a range changer, is slidably splined to the shaft 742 and is moved longitudinally by the fork 783. As shown in FIG. 22, the gear 777 is in engagement with the internal gear 779 formed integrally with the gear 757 to couple the gear 757 for rotation with the shaft 742 and transmits power from the shaft 742 to the spindle 761 via the engaged gears 757 and 773. When the couplet 776 is shifted to its other shiftably adjustable position, the gear 777 is moved out of engagement with the internal gear 779 and the gear 778 meshes with the gear 772 to drive the spindle 761.

The feed drive power train is illustrated in the lower portion of FIG. 22. As there illustrated, the feed motor 803 is operatively connected to drive the feed transmission 801. The feed transmission 801 drives an output shaft 1036 having gears 1037 and 1038 secured at opposite ends of the shaft. Gear 1037 meshes with a gear 1039 connected to the rapid traverse clutch 992, and the gear 1038 meshes with the gear 1041 connected to the feed clutch 993. Selective actuation of either the rapid traverse clutch 992 or the feed clutch 993 connects the transmission 801 to drive a shaft 1042 having a gear 1043 fixedly secured to one end thereof. Gear 1043 is disposed to continuously mesh with an independently rotating gear 1044 comprising a part of a reversing clutch 1046, and with a gear 1047 fixedly secured to a shaft 1048. The gear 1044 together with a gear 1049 and a shiftable jaw clutch collar 1051 are carried by the shaft 51 and comprise the reversing clutch 1046 for selectively moving the saddle in either direction in its plane of travel. The shiftable jaw clutch 1051 is slidably splined to the shaft 51 and is provided with teeth on each of its sides which are engageable with cooperating teeth formed in the adjacent sides of the hubs of the gears 1044 and 1949. The lever 56 is operatively connected to the jaw collar 1051 to move it in either direction from the neutral position, as shown in FIG. 22, to an engaged position with either gear 1044 or 1049.

The shaft 1048, in addition to carrying the gear 1047, carries a gear 1053 securely fixed thereto and an independently rotating gear 1054. Gear 1053 is continually in engagement with the gear 1049 of the clutch 1046 and with a gear 1056 of a reversing clutch 1057. The reversing clutch 1057, which is operative to selectively move the knee in a vertical plane, is carried by the shaft 55 and comprises the gear 1056, a gear 1059, and a shiftable jaw clutch collar 1061. The gears 1056 and 1059 are rotatably supported on the shaft 55 for independent rotation while the jaw clutch collar 1061 is slidably splined to the shaft and provided with teeth on each of its sides which are adapted to cooperate with teeth formed in the adjacent sides of the gears 1056 and 1059. As shown in FIG. 22, the clutch collar 1061 is in the neutral position, and is shifted to an engaged position, engaging the jaw teeth of either of the rotating gears 1056 or 1059, by means of the lever 56A. The gear 1059 is rotatably driven by the gear 1054 which, in turn, is driven by the gear 1044. The gears 1044 and 1049 of the directional clutch 1046 are rotatably driven in opposite directions relative to each other, and likewise the gears 1056 and 1059 of the directional clutch 1057 are driven in opposite directions with respect to each other, thereby providing two directions of rotation for the shafts 51 and 55. To this end the gear 1044 is driven in one direction by the gear 1043 while the gear 1049 is driven in the opposite direction by means of the gear 1043 driving the gear 1047, the shaft 1048 and the gear 1053 which is in engagement with the gear 1049. In the directional clutch 1057 the gear 1056 is driven by the gear 1053 which is secured to the shaft 1048. The gear 1059 is driven by the gear 1054, independently rotatable about the shaft 1048, which meshes with the gear 1044 of the directional clutch 1046; the gear 1044 being driven by the gear 1043. By assuming a particular direction of rotation of the shaft 1042 which drives the gear 1043, it will be apparent by following through the gear train that the gears 1044 and 1049 rotate in opposite directions relative to each other, and so do the gears 1056 and 1059 of the directional clutch 1047. For example, assuming the shaft 1042 and gear 1043 rotate clockwise when viewed from the left side of FIG. 22, the gear 1044 carried by the shaft 51 and the gears 1047 and 1053 secured to the shaft 1048 rotate in a counter clockwise direction. Counter clockwise rotation of the gear 1053, in turn, effects clockwise rotation of the gear 1049. Therefore it will be noted that the gears 1044 and 1049 rotate in opposite directions on the shaft 51. Thus when the jaw collar 1051 is shifted to engage the teeth in the hub of the gear 1044, the shaft 51 is rotated on one direction and when the collar is shifted to engage the teeth in the hub of the gear 1049, the shaft 51 is rotated in the opposite direction.

In addition to rotating the gear 1049 clockwise, the gear 1053 also rotates the gear 1056 of the directional clutch 1057 in a colckwise direction. The gear 1059 is driven in a counterclockwise direction by the gear 1054, which in turn, is driven clockwise by the counterclockwise rotating gear 1044. Therefore, it will be noted that the gears 1056 and 1059 rotate in opposite directions on the shaft 55. Thus, when the jaw collar 1061 of the clutch 1057 is shifted to engage the teeth in the hub of the gear 1059, the shaft 55 is rotated in one direction and when the collar is shifted to engage the teeth in the hub of the gear 1056 the shaft is rotated in the opposite direction.

Power for translating the worktable 41 is transmitted from the shaft 1048 via the gears 1053 and 1049 to a gear 1061 secured to the gear 1049 and freely rotatable about the shaft 51 with the gear 1049. The gear 1061 meshes with a gear 1062 secured to one end to the shaft 1063. A bevel gear 1064 is secured to the opposite end of the shaft 1063 and engages a bevel gear 1066 secured to a shaft 1067 having a bevel gear 1068 secured to its opposite end. Bevel gear 1068 meshes with bevel gears 1069 and 1071 that are independently rotatable about the feed screw 49 to rotate them in opposite directions. The bevel gears 1068, 1069 and 1071 together with a shiftable jaw clutch collar 1072 slidably splined to a sleeve (not shown) keyed to the feed screw 49 comprise a reversing clutch 1073 for the worktable 41. The clutch collar 1072 presents teeth on each side which are adapted to cooperatively engage with teeth presented by the adjacent sides of the hubs of the gears 1069 and 1071 upon being shifted to an engaged position. A lever 1074 is operatively connected to the clutch collar 1072 for selectively shifting it to either of its two engaged positions of the neutral position and vice versa for selectively engaging the gears 1069 and 1071 to rotate the screw 49 in either direction. The feed screw 49 threadedly engages a nut (not shown) carried by a depending hub 1076 secured to the workable 41 for effecting worktable movement upon rotation of the feed screw.

As described hereinbefore, the rapid traverse valve 979, FIGS. 15, 20 and 21, is operative to actuate the feed clutch 993 as well as the rapid traverse clutch 992 when the spindle 57 is in a stopped condition and the spindle brake 181 is applied. By referring to FIG. 22, it will be observed that the reversing clutches 1046, 1057 and 1073 all received their driving power via the shaft 1042 which is operably connected to both the feed clutch 993 and the rapid traverse clutch 992. Actuation of either clutch 992 or 993 effects a driving connection between the actuated clutch and the shaft 1042 thereby transmitting power from the transmission 801 to the shaft to drive it at either feed rate or rapid rate. It will then be apparent that by selective actuation of the reversing clutches 1046, 1057 and 1073 the saddle 46, knee 37, and worktable 41 can be independently or simultaneously moved in either direction of their respective directions of movement at feed rate or rapid rate while the spindle brake 181 is applied.

The operative details of the electrical control circuit for effecting selective energization of the spindle motor 58 and the feed motor 803 are illustrated in simplified form in FIG. 23. As there shown, electrical energy for operating the motors and control elements is derived from line conductors $L_1$, $L_2$ and $L_3$; the line conductors being connected to a source of power by means of a disconnecting switch 1079 in the usual manner. In order to energize the motors or any of the control elements, it is necessary to energize a main control circuit, shown in the lower part of FIG. 23, by means of a transformer 1081 having a primary winding 1082 and a secondary winding 1083. One terminal of the primary winding 1082 is connected to the line conductor $L_1$ and the other terminal connected to the conductor $L_2$ in this instance. The secondary winding 1083 of the transformer 1081 is adapted to supply electrical energy at the desired voltage for the main control circuit. Although not shown in the drawings, the control circuit is provided with the usual fuses and overload devices interconnected at appropriate points in well known manner to afford protection in the event of a short circuit or overload condition.

Energization of the main control circuit is effected by depressing a normally open master start switch 1084 that comprises part of a master control box having a master stop switch 1086. With the master start switch 1084 momentarily depressed to closed position, current will flow from one terminal of the secondary winding 1083 through a conductor 1087, a conductor 1088, and the closed contact bar of the master start switch 1084 to a conductor 1089. From the conductor 1089, the flow of current continues through a conductor 1091, a conductor 1092, a relay CR1 and a conductor 1094 to an energized conductor 1095 connected to the opposite terminal of the secondary winding 1083. Energization of the relay CR1 effects closure of its associated normally open contact bars CR1-1, CR1-2 and CR1-3 to energize the feed motor 803. Simultaneously, current will flow from the conductor 1089 through a conductor 1099, the normally closed contact bar of the master stop switch 1086, a conductor 1101, a relay CR2 and a conductor 1103 to the conductor 1095. Energization of the relay CR2 effects closure of its associated normally open contact bars CR2-1, CR2-2 and CR2-3 to energize the spindle motor 58 and closure of a normally open contact bar CR2-4 establishing a holding circuit for retaining the relays CR1 and CR2 energized when the master start switch is released. The holding circuit is established through a shunting conductor 1109, the now closed contact bar CR2-4 to a conductor 1111. From the conductor 1111 current continues to flow through the relays CR1 and CR2 to the secondary winding 1083 as described hereinbefore.

It will be apparent from FIG. 23 that simultaneously with depressing the master start switch 1084 and establishment of the holding circuit by closure of contact bar CR2-4, a control circuit is conditioned for selectively actuating the spindle clutch 77, FIG. 15. Upon depressing a spindle start switch 1112 current will flow from the conductor 1091 through a conductor 1113, a normally closed contact bar 1114, a conductor 1116 and the closed contact bar of the spindle start switch 1112 to a conductor 1117. From the conductor 1117 current continues to flow through a relay CR3 and a conductor 1119 to the conductor 1095 connected to the secondary winding 1083. Simultaneously therewith, current will flow from the conductor 1117 through a conductor 1121, a conductor 1122, the solenoid 613 and a conductor 1123 to the conductor 1095. Energization of the solenoid 613 effects actuation of the spindle clutch 78 by moving the valve spool 611, FIG. 15, rightwardly to connect the pressure supply line 605 to the line 588 thereby transmitting pressure fluid to the clutch causing the spindle to rotate. A holding circuit to retain the solenoid 613 and the relay CR3 energized when the spindle start switch is released, is established by the closure of a contact bar CR3-1 associated with the energized relay CR3. Current will then flow through a shunting conductor 1126, the closed contact bar CR3-1 of the relay CR3, and a conductor 1127 to the conductor 1122. From the conductor 1122 current continues to flow through the solenoid 613 and a conductor 1123 to the conductor 1095 connected to the secondary winding 1083. Likewise, current will flow from the conductor 1127 in the shunt circuit through the conductor 1121, the conductor 1117, the relay CR3 and the conductor 1119 to the conductor 1095 to retain the relay CR3 energized.

To terminate spindle rotation, the solenoid 613 and the relay CR3 are denergized by depressing the spindle stop switch 1114 thereby interrupting the flow of current through the holding circuit to the solenoid and relay. Deenergizing the relay CR3 returns the contact bar CR3-1 to its normally open position thereby opening the holding circuit. With the flow of current to the solenoid 613 interrupted, the valve spool 611 will be moved leftwardly by the compressed spring 612 connect the spindle clutch 77 to exhaust and to direct pressure fluid to the spindle brake 181. To stop the spindle motor 58 and the feed motor 803, the relays CR1 and CR2 are deenergized by depressing the master stop switch 1086 thereby interrupting the flow of current to the relay CR2. Deenergization of relay CR2 interrupts the flow of current through the conductors 1109 and 1111 of the holding circuit by moving the contact bar CR2-4 to its normally open position. Interruption of the flow of current in the holding circuit not only effects deenergization of the relay CR1 but also stops the flow of current in the conductor 1113 for energizing the relay CR3 and solenoid 613.

From the above description of the electrical circuit it will be apparent whenever the master start switch 1084 is depressed the motors 58 and 803 will be started and retained in operation. Since the hydraulic pumps 84 and 966 are operatively connected to the motors 58 and 803, respectively, the hydraulic systems for operating the speed and feed transmissions and their associated controls will be conditioned for subsequent operation. Since the spindle clutch 77 is independently actuated by the spindle start switch 1112, it will be apparent that the worktable 41, saddle 46 and the knee can be independently and simultaneously operated without having the spindle rotating.

From the foregoing explanation of the construction and operation of a preferred embodiment of the invention, it is apparent that there has been provided an improved transmission and control mechanism for a milling machine that is selectively operable to provide a plurality of speeds with minimum shifting of gears. The transmission and control mechanism is so integrated as to form a compact unit of greatly simplified construction and operation.

Although only one principal embodiment and several modifications have been shown it will be apparent to one skilled in the art to which this invention relates, that various other modifications in the manner of constructing the transmission and control mechanism may be made without departing from the spirit and scope of the invention as defined in the subjoined claims.

The principles of this invention having now been fully explained in connection with the foregoing description, we hereby claim as our invention:

1. In a time delay mechanism for retarding the flow of pressure fluid to a fluid actuated device; a valve body; a pair of cylinders formed within said valve body; a pair of pistons slidable longitudinally and independently of each other being carried within said respective cylinders, each piston being provided with an opening extending longiutdinally therethrough, said valve body being provided with a plurality of fluid conducting passageways having communication with said cylinders, one of the passageways connecting said cylinders to exhaust, another of the passageways being in communication with one of said cylinders and with said hydraulically actuated device; a spring disposed between said pistons in a manner to bias said pistons in opposite directions within their respective cylinders; and a source of pressure fluid operatively connected to said cylinders, one of said pistons being provided with means for distributing pressure fluid from said source to one of the passageways; whereby the flow of pressure fluid to said fluid actuated device is retarded a predetermined interval of time regardless of the viscosity of said pressure fluid.

2. In a valve mechanism for selectively actuating a plurality of clutches; a valve body provided with a cylinder; a stationary valve sleeve being provided with spaced apart radial passages and being fixedly carried within said cylinder; a valve spool provided with cannelures and slidably carried within said valve sleeve and connected at one end to be longitudinally movable manually; a piston slidably supported in said cylinder and disposed to be in abutting engagement with said valve spool at selected intervals; a spring operatively connected to bias said valve spool into abutting engagement with said piston; a source of pressure fluid having communication with said valve sleeve, said valve body being provided with a plurality of passages for conducting pressure fluid through said valve, said valve spool being provided with a plurality of passages for distributing pressure fluid within said valve; and an interlock line connected to conduct pressure fluid to one end of said piston whereby a change in pressure in said interlock line displaces said piston and said valve spool to a predetermined position with further displacement of said valve spool being effected manually.

3. In a valve mechanism for selectively actuating hydraulic devices; a valve body presenting a cylindrical bored opening; a stationary sleeve securely mounted in the cylindrical bored opening, said sleeve being provided with a plurality of spaced apart radial passages; a valve spool slidably carried within said valve sleeve and provided with a plurality of integrally formed cannelures; a piston slidably supported in the cylindrical bored opening in a manner to abut one end of said valve spool, said valve body being provided with a plurality of passages for receiving and distributing pressure fluid and having communication with the passages in said sleeve, said valve spool having a plurality of passages communicating selectively with the cannelures in said spool for distributing pressure fluid; a spring connected to bias said valve spool into abutting engagement with said piston; a lever operatively connected to said valve spool for manually displacing said valve spool; a source of pressure fluid operatively connected to one of the passages in said valve body; and an interlock line connected to one end of the cylindrical bored opening for conducting pressure fluid to one end of said piston to urge said piston and said abutting valve spool to a predetermined position to block reception of pressure fluid to said valve mechanism to render inoperative any previous selection by said mechanism.

4. In a machine tool; a feed transmission comprising a transmission frame; a plurality of shiftable gears rotatably supported in said frame; a plurality of shifter members, one shifter member being provided for each pair of said shiftable gears; a plurality of power actuators operatively disposed in said frame with several of said power actuators having a larger internal diameter than the remainder of said power actuators and one power actuator of each diameter being connected to opposite ends of each of said shifter members respectively, each power actuator having an active position and a neutral position; a selector valve; a plurality of fluid conducting conduits operably connected between said power actuators and said selector valve, said power actuators, shifter members and gears being housed in said transmission frame as a unitary assembly; a plurality of cover plates secured to the opposite ends of said transmission frame; and an electric motor operatively mounted on said transmission frame and connected to drive said transmission; whereby said feed transmission and motor form a self contained unit for attachment to or removal from a machine tool as a unit.

5. In a transmission and control mechanism for a machine tool; a transmission frame; a plurality of pairs of shiftably adjustable gears carried within said frame; a plurality of shafts journalled in bearings in said frame and adapted to carry said shiftable gears; a plurality of shifter members carried within said transmission frame and operably connected to said shiftable gears; a plurality of power actuators comprising piston and cylinder mechanisms, several of said power actuators being provided with a larger diameter piston and cylinder than the other of said power actuators, the cylinder of each of said power actuators being formed integrally with said transmission frame, said piston of each power actuator being integrally formed with one end of said respective shifter members with each of said shifter members having a large diameter power actuator disposed at one end and a small diameter power actuator disposed at its opposite end; a rotary selector valve having a valve body formed integrally with said transmission frame and adapted to receive pressure fluid and distribute it to said power actuators, said valve body being provided with a cylindrical bored opening and a plurality of radial passages; a stationary sleeve having a plurality of radial spaced apart passages and annular grooves carried within the bored opening of the valve body; a rotatable sleeve having a plurality of annular grooves and spaced apart radial passages carried within said stationary sleeve, the rotation of said rotatable sleeve selectively placing in register the passages of said stationary sleeve and said rotatable sleeve; a plunger having a cannelure carried within said rotatable sleeve and connected to rotate therewith and adapted to be movable longitudinally independently of said rotatable sleeve; a plurality of passages formed in said transmission frame for selectively connecting said rotary valve with said power actuators; a first cover plate provided with a plurality of grooves secured to the transmission frame in a manner that the grooves register with selected passages in said frame and simultaneously cover the open cylinder ends of said large diameter power actuators; a second cover plate provided with a groove secured to said frame in a manner to cover the open cylinder ends of said power actuators having small diameter pistons and cylinders, while the groove is in communication with all of said actuators having small diameter pistons and cylinders; and a pair of cover plates secured to opposite ends of the transmission frame in a manner to retain said shafts in said transmission frame; whereby a transmission and control mechanism is formed as an integral unit that is unitarily attachable to or removable from a machine tool and is capable of being interchangeable with other identical transmissions.

6. In a speed transmission for a machine tool; a transmission frame; a plurality of pairs of shiftably adjustable gears having only two shiftably adjustable positions; said shiftable gears being rotatably supported in said transmission frame; a plurality of shifter rods; a shifter fork secured to each of said shifter rods and adapted to engage one pair of said shiftably adjustable gears; a plurality of power actuators, each of said shifter rods having a power actuator connected to each of its ends; said power actuators comprising a piston and cylinder mechanism having the cylinder integrally formed with the transmission frame, said piston of each power actuator being formed integrally with each end of said shifter rod respectively; a multi-flow selector valve having a valve body formed integrally with said transmission frame; a manifold connecting said selector valve with said power actuators, said manifold comprising a plurality of conduits formed integrally in said transmission frame, a pair of cover plates having recesses formed therein secured to the transmission frame in a manner to cover the open ends of the cylinders formed in said transmission frame, the recesses in said cover plates constituting a portion of said manifold; whereby an integrated transmission and control mechanism therefor are constructed and arranged within an integrated frame adapted to be attached to or removed from a machine tool as a single unit.

7. In a machine tool; a frame; input gearing and output gearing mounted on said frame in spaced relation; a speed transmission comprising a plurality of relatively shiftable gears correlated to form a train of gearing having input gearing and output gearing at opposite ends of said train; a plurality of actuators integrally formed with said speed transmission and connected to effect shifting of said gears in said transmission; control means integrally formed with said speed transmission operable to regulate selective action of said actuators; means operably connecting said control means with said actuators whereby there is provided an improved and simplified integrated transmission and control therefor; and means for mounting said integrated transmission and control as a unit on said frame wherein the spacing of said input and output gearing on said frame and transmission are so relatively spaced as to come into operating engagement.

8. In an integrated transmission assembly and control therefor; a housing; a plurality of shiftably adjustable gears carried within said housing; a plurality of shafts adapted to carry said shiftable gears; a plurality of shifter rods operatively connected to said shiftable gears; a plurality of power actuators each comprising a piston and cylinder assembly, a number of said power actuators having large internal cylinder diameter while the remainder number of said power actuators having a small internal cylinder diameter, said cylinders being integrally formed in said housing, said pistons being integrally formed at the opposite ends of said shifter rods, each of said shifter rods having a large internal diameter power actuator disposed at one end and a small internal diameter power actuator disposed at its opposite end, the power actuators so disposed being operable as a differential piston; a control valve having its valve body integrally formed with said housing, said control valve being adapted to selectively direct pressure fluid to said power actuators in predetermined relationship to effect selected gear shifts in said transmission; and means integrally formed in said housing connecting said control valve with said power actuators.

9. In a variable speed transmission for driving a machine tool element; a transmission frame having a supply opening and a plurality of chambers forming a first and a second set of chambers, said frame having a plurality of passages formed therein each of certain ones of which interconnects the supply opening with each one of the first set of chambers, the other passages forming selected passages to each of said second set of chambers; a piston slidably contained in each of the chambers; a plurality of non-shiftable gears journalled in said frame; a plurality of shiftable gears journalled in said frame and movable axially for selective meshing engagement with said non-shiftable gears to vary the output speed of the transmission; a plurality of shifter elements connected to said respective pistons and said shiftable gears so that movement of said pistons in their respective chambers effects a shifting movement of their associated shiftable gears for changing the output speed of the transmission, said connection including the connection of one piston of each set of chambers to each shifter element; a source of hydraulic pressure connected to supply pressurized fluid to the supply opening in said frame; and a rotary valve carried in said frame and operable to directly connect the pressurized fluid to the selected passages in said frame for selectively actuating said pistons of the second set of chambers to establish a predetermined output speed for the transmission.

10. In a variable speed transmission for driving a machine tool element; a transmission frame having a plurality of power actuators, effectively forming a first group of low power and a second group of high power actuators; a plurality of non-shiftable gears journalled in said frame; a plurality of shiftable gears journalled in said frame and movable axially for selective meshing engagement with said non-shiftable gears to vary the output speed of the transmission; a plurality of shifter elements each connected at one end to a low power actuator, at its other end to a high power actuator and at its middle to its associated shiftable gears so that movement of said shifter elements by their respective high power actuators effects a shifting movement of their associated shiftable gears for changing the output speed of the transmission; a source of power; and means operably connected to direct said power continuously to said low power actuators and selectively and continuously to said high power actuators to overcome associated low power actuators selectively to establish a predetermined output speed for the transmission.

11. In a machine tool; a feed transmission comprising a transmission frame; a plurality of shiftable gears rotatably supported in said frame; a plurality of shifter members for said shiftable gears; a plurality of power actuators each having an active position and a neutral position, some of said power actuators being formed with a larger internal diameter than the remainder of said power actuators and one power actuator of each diameter being connected to opposite ends of each of said shifter members respectively; a selector valve; a plurality of fluid conducting conduits operably connected between said power actuators and said selector valve, said power actuators, shifter members and gears being housed in said transmission frame as a unitary assemblage; cover plates secured to the opposite ends of said transmission frame; and an electric motor operably mounted on said transmission frame and connected to drive said transmission; whereby said feed transmission and motor are capable of being attached to or removed as a unit from a machine tool.

12. In a control system for a machine tool; a source of power; a frame; a member supported by said frame for rectilinear movement; a spindle rotatably supported by said frame; a spindle clutch actuatable hydraulically to connect said source of power to said spindle for rotation of the latter; a brake actuatable hydraulically to restrain the rotation of said spindle; a feed clutch actuatable hydraulically to connect said source of power to said member for effecting movement of said member at a feed rate; a rapid traverse clutch actuatable hydraulically to connect said source of power to said member for effecting movement of said member at a rapid rate; a source of hydraulic pressure; a rapid traverse control valve operatively connected to control the flow of hydraulic pressure from said source selectively to said rapid traverse clutch and to said feed clutch for actuating either of said clutches to produce movement of said member at a rapid rate or at a feed rate, said valve also having a neutral position for disconnecting both said rapid traverse clutch and said feed clutch from said source of hydraulic pressure; means continuously resiliently biasing said rapid traverse control valve to the feed position for connecting said source of hydraulic pressure to said feed clutch; a spindle control valve operably connected to control the flow of hydraulic pressure from said source selectively to said spindle clutch and to said brake to thereby effect rotation of said spindle or to restrain said spindle from rotation; a hydraulic actuator operable when energized to actuate said rapid traverse valve against said biasing means to a neutral position for disconnecting both said feed clutch and said rapid traverse clutch from said source of hydraulic pressure; an interlock line connected between said spindle brake and said hydraulic actuator to carry hydraulic pressure to said actuator to shift said rapid traverse valve to the neutral position whenever said spindle brake is actuated; and manually operable means for actuating said valve in one direction against said biasing means to connect said source of pressure to said rapid traverse clutch while disconnecting said feed clutch from said pressure source, said valve actuating means being also operable to overcome the force of said hydraulic actuator to move said valve in the opposite direction for effecting a feeding movement of said member even though said spindle is not rotating.

13. In a control system for a machine tool; a frame; a source of power; a tool carrying spindle supported by said frame and rotatable by said source of power; a member slidably mounted on said frame for rectilinear movement; control means operable to regulate the movement of said member for selectively actuating said member at either a feed rate or at a rapid rate of travel, said control means also having a neutral condition for rendering said member idle; interlock means operable to shift said control means to the neutral condition whenever said spindle is idle; and manual means operable to shift said control means to produce movement of said member at a rapid rate or to shift said control means in opposition to said interlock means to produce movement of said member at a feed rate even though said spindle is idle.

14. In a control system for a machine tool; a frame; a source of power; a cutter carrying spindle supported by said frame and rotatable by said source of power; a member slidably mounted on said frame for rectilinear movement; a feed clutch actuatable hydraulically to connect said source of power to said member for effecting movement of said member at a feed rate; a rapid traverse clutch actuatable hydraulically to connect said source of power for effecting movement of said member at a rapid rate; a source of hydraulic pressure; a rapid traverse control valve operatively connected to control the flow of hydraulic pressure from said source selectively to said rapid traverse clutch and to said feed clutch to actuate the same and thereby cause movements of said member at either a rapid rate or at a feed rate, said valve also having a neutral position for disconnecting both said rapid traverse clutch and said feed clutch from said source of hydraulic pressure; biasing means continuously but yieldably biasing said rapid traverse control valve to the feed position for connecting said source of hydraulic pressure to said feed clutch; interlock means connected to function whenever said spindle is idle to shift said control valve to the neutral position against the force applied by said biasing means and to oppose the shifting of said control valve to the feed position; and manually actuated means operable to shift said control valve in one direction against the force of said biasing means to the rapid traverse position for actuating said rapid traverse clutch to effect movement of said member at a rapid rate, said manually actuated means being also operable to shift said control valve in the other direction to feed position in opposition to said interlock means for actuating said feed clutch to effect movement of said member at a feed rate even though said spindle is idle.

15. In a valve for retarding the flow of pressure fluid to a fluid actuated device; a valve body; a pair of cylinders formed within said body; a pair of pistons slidable independently of each other within said respective cylinders, each piston being provided with an opening extending longitudinally therethrough, said valve body being provided with a plurality of fluid conducting passageways having communication with said cylinders, one of the passageways connecting said cylinders to exhaust and another of said passageways being in communication with one of said cylinders and with said hydraulically actuated device; resilient means urging said pistons away from each other; and a source of pressure fluid operatively connected to said cylinders, one of said pistons being provided with means for distributing pressure fluid from said source to one of the passageways; whereby the flow of pressure fluid to said fluid actuated device is retarded a predetermined interval of time regardless of the viscosity of said pressure fluid.

16. In a valve for retarding the flow of pressure fluid to a hydraulically actuated device; a source of fluid pressure; a valve body having a large diameter bore and a reduced diameter bore, said valve body having an inlet port and an outlet port as well as a first orifice in communication with the end of the large diameter bore and a second orifice in communication with the end of the small diameter bore; a piston slidably carried within the large diameter bore, said large piston having a longitudinal opening; a piston slidably carried within the small diameter bore, said small piston having a longitudinal opening and a cannelure about its periphery, the cannelure being normally in communication with both the inlet port and the outlet port of said valve body; a spring operably engaged to urge said pistons apart; a conduit connecting the outlet port of said valve body to the device which is to be actuated; means connecting said source of fluid pressure to the inlet port of said valve body so that the pressure may be directed to the outlet port through the cannelure in said small piston; a first line branching from said conduit and connected to the first orifice in said valve body to direct hydraulic pressure into the large diameter bore of said valve body for urging said large piston toward said small piston against the force of said spring whenever pressure is flowing to the device to be actuated; and a second line branching from said conduit and connected to the second orifice in said valve body to direct hydraulic pressure into the small diameter bore of said valve body for urging said small piston toward said large piston against the force of said spring and thereby shift the cannelure on said small piston out of registration with at least one of the ports in said valve body to interfere with the flow of hydraulic pressure to the device to be actuated; whereby the initial flow of pressure to said device causes said small piston to move in its bore and shift its associated cannelure with respect to the inlet and outlet ports and thereby retard the flow of hydraulic pressure to said device until said large piston gradually overcomes the pressure applied by said small piston to move the same to a position in which the full flow of pressure is admitted through the cannelure to said device.

17. In a valve for retarding the flow of pressure fluid to a hydraulically actuated device; a source of fluid pressure; a valve body having a large diameter bore and a reduced diameter bore as well as an inlet port and an outlet port; a large piston slidably carried within the large diameter bore; a small piston slidably carried within the small diameter bore, said small piston having a passage which is normally in registration with both the inlet port and the outlet port of said valve body; resilient means operable to yieldably urge said pistons apart; a conduit connecting the outlet port of said valve body to the device which is to be actuated; means connecting said source of fluid pressure to the inlet port of said valve body so that the pressure may be directed to the outlet port through the passage in said small piston; means operable in response to the flow of pressure in said conduit to direct hydraulic pressure into the two bores in said valve body for urging said pistons toward each other against the force of said resilient means to thereby momentarily shift the passage in said small piston out of registration with one of the ports in said valve body to interfere with the flow of pressure to the device being actuated; and escape means through which the pressure on said pistons can escape at a controlled rate; whereby the initial flow of pressure to the actuated device causes said small piston to shift its associated passage to retard the flow of hydraulic pressure to the actuated device until said large piston gradually overcomes the pressure applied by said small piston to force the latter to its normal position and thereby admit the full flow of pressure through the passage to the actuated device.

18. In a machine tool; a frame; a spindle journalled in said frame; a knee slidably supported by said frame for movement in a vertical path relative to said spindle, said knee having a front wall with a central opening; a saddle carried by said knee for movement in a horizontal path; a work supporting table slidably mounted on said saddle for horizontal movement in a direction transverse to the direction of movement of said saddle; a unitary feed transmission mounted on the front wall of said knee to extend into the knee from the front wall opening, said transmission including means connectable to drive said knee, saddle and table in a feeding movement; and a drive motor connected to said feed transmission and mounted on the outer end of said transmission so that it is located at the opening in the front wall of the knee whereby said feed transmission and motor assembly may be installed in the machine as a unit through the front wall opening in the knee and the central location of the assembly will cause the heat from the transmission and the motor to be evenly distributed through the knee structure.

19. In a machine tool; a frame; a cutter carrying spindle rotatably supported by said frame; a hollow work supporting member slidably supported by said frame for a feeding movement relative to said spindle to feed the work carried by said member to the cutter for performing a machining operation, said member having a front wall formed with a central opening; a unitary feed transmission adapted to pass through said central front wall opening and mounted on said front wall to extend into said member, means connecting said transmission to said member to drive said member in the feeding movement; and a drive motor connected to said feed transmission and mounted on the outer end of said transmission so that it is located at said central front wall opening, whereby said feed transmission and motor assembly may be installed in the machine as a unit through the front wall opening and the central location of the assembly will cause the heat from the transmission and the motor to be evenly dissipated from the center of said member to avoid distortion thereof.

20. In a selectively power driven variable speed transmission for a machine tool, a plurality of rotatably journalled gears constrained against axial shifting movement, a plurality of cooperatively disposed gears carried for axial shifting movement to one of two positions and being selectively movable into meshing engagement with selected ones of said non-shiftable gears to form a multi-varied train of gearing, a plurality of power driven actuators respectively operable to effect axial movement of said shiftable gears to one of two shiftably adjusted positions, common power drive means operable to urge said actuators in one direction for yieldingly maintaining said associated gears in one of their two shiftably adjusted positions, a plurality of selectively operative separate hydraulic drive means operable to respectively move selected ones of said actuators in a direction opposite to and against the yieldability of said power drive means for shifting and maintaining corresponding ones of said associated gears in the other of their two axially adjusted positions, hydraulic control means including a source of pressure fluid; and means to direct said sources of pressure fluid to actuate said separate hydraulic drive means selectively for effecting axial adjustment of said shiftable gears to selectively vary the output speed of said transmission and to continue the direction of fluid to the selected ones of said separate hydraulic drive means during the time the selected speed is used.

21. In a selectively power driven variable speed transmission mechanism for a machine tool, a plurality of non-shiftable gears and a plurality of shiftable gears selectively engageable therewith in different predetermined combinations to vary the output speed ratio and form a multi-varied train of gearing, said shiftable gears being movable to one of two shiftably adjusted positions, shifting means including yieldable drive means operable to yieldingly urge said shiftable gears to one of the two shiftably adjusted positions, a plurality of separate power drive means respectively and individually operable to effect selective movement of said shifting means in opposition to the yieldable urge of said yieldable drive means for moving correspondingly associated ones of said shiftable gears to the other of the two shiftably adjusted positions, and control means individual to each of said separate power drive means, each of said control means when actuated creating a continuous active force against associate separated drive means operable to effect selective actuation of said separate drive means for effecting predetermined desired shifting movement of said shiftable gears and to actively maintain the shifted gears in shifted position.

22. In a power driven variable speed transmission for a machine tool, a plurality of shiftable members selectively movable into one of two axially adjusted positions for varying the output speed thereof in predetermined steps, yieldable drive means operable to move said shiftable members to one of their axialy adjusted positions and to maintain said shiftable members in said one position under a yieldable force, separate power drive means individual to and selectively operable to move said shiftable members to the other of their axially adjusted positions in opposition to the yieldable force of said yieldable drive means, and control means operable to effect individual selective actuation of said separate power drive means by creating and continuing an active force with respect to the selected power drive means to overcome said yieldable force and maintain said shiftable members in shifted position.

23. In a control system for effecting selective adjustment of a shiftably geared machine tool transmission; power operable shifting actuators movable into one of two axially adjusted positions; a frame adapted to support said actuators for movement, said frame being provided with spaced apart openings for receiving said actuators and an integrally formed spaced apart manifold opening for receiving a control valve; common drive means continuously operable to respectively urge each of said actuators in one direction to one position of adjustment, said frame provided with separate fluid transmission lines respectively interconnected between the actuator openings and the manifold valve opening formed therein; a source of pressure fluid, and control valve means operably movable in the manifold valve opening formed in said frame to so interconnect the transmission lines formed therein with the source of pressure fluid as to selectively move said actuators in opposition to said common drive means to the second position of adjustment and to continue the interconnection to maintain said actuators in said second position of adjustment.

24. In a valve mechanism adapted for the selective activation of a plurality of actuators, a valve having stationary and movable parts provided with ports and conduits for the admission and exhaust of pressure fluid thereto and for the selective conduction of such fluid to conduits for transmission to either of said actuators or to condition said actuator conduits to exhaust, adapted thereby to immobilize the actuators, a piston adapted to abut the movable part of said valve and, when actuated, to condition said actuator conduits to exhaust, a spring to bias said movable part of said valve into abutting engagement with said piston, a manual control for said movable part and a separate conduit for admitting pressure fluid for actuating said piston, said separate conduit adapted to be connected to an interlock line to immobilize said actuators at a time when said interlock line is placed under fluid pressure.

25. In a time delay valve mechanism for retarding the flow of pressure fluid in a fluid line: a pair of cylinders, one being larger than the other; a pair of pistons, one being larger and one being smaller and being within said respective cylinders; a compressible medium acting against said pistons to force them inwardly of their cylinders and being capable of creating an increasing greater force as said pistons are moved outwardly of their cylinders; first means for conducting the incoming fluid of a pressure fluid line into said valve mechanism; second means conducting the fluid pressure out of said valve mechanism; conduits extending from said second means to said cylinders for operating said pistons against said compressible medium, each piston and cylinder combination having a restrictive bleed to exhaust, a flow valve operated by the movement of said smaller piston and connecting said incoming and outgoing conducting means to gradually cut off or open a fluid line, the construction being so coordinated that fluid entering said valve mechanism will move said pistons outwardly until said small piston actuates said flow valve to stop the incoming fluid, said pistons then being operated by said compressible medium and governed by the restrictive exhaust, moving inwardly until the smaller piston opens said flow valve and the flow of pressure against said larger piston finally creates sufficient pressure in said compressible medium to move the smaller piston inwardly, fully opening said flow valve and maintaining said flow valve in full open position.

26. In a timed delay mechanism for retarding the flow of pressure fluid in a fluid line; a pair of fluid motors each including a cylinder and piston combination, a fluid supply line and a restrictive bleed to exhaust; a compressible medium reacting against said pistons to force them inwardly of their cylinders and being capable of creating an increasing greater force as said pistons are moved outwardly of their cylinders; a flow valve connecting the incoming and outgoing fluid of a fluid line, said flow valve being so constructed as to be actuated by the outward movement of one of said fluid motors, means connecting the fluid supply of each of said fluid motors to the outgoing fluid of said valve mechanism, said fluid motors being so constructed that said one fluid motor creates less force on said compressible medium than the other so that an initial flow of fluid in the fluid line will move both pistons outwardly thereby compressing said compressible medium and closing said flow line as said one piston moves outwardly whereupon said motors will be moved inwardly, under the force of the compressible medium and the restrictive exhaust of fluid, until said one fluid motor opens said flow valve for again supplying fluid to said fluid motors until the greater force application of said other fluid motor against said compressible medium finally overcomes the smaller force of said one fluid motor which thereafter remains inwardly with said flow valve fully open.

27. A selectively varied transmission including a plurality of shafts and gearing, means mounting said shafts and gearing in coordinated relationship to form a train of different gearing ratios so that an input to said transmission will derive a certain ouput and so that all of said gearing are so mounted that they are either fixed against shifting or mounted for being shifted to two positions only, a normal position of engagement or a change position for imposing different selective ratios on said transmission to vary its output, means urging said shiftable gearing to their position of normal engagement, actuating means individual to each shiftable gearing for receiving a continuous application of force against said urge to shift said shiftable gearing to its change position, and control means for selectively and individually supplying and continuing the supply of force to any one or any combination of said actuating means to impose selective ratios on said transmission to obtain the output desired.

28. A transmisison including a train of gearing coordinated for receiving an input and deriving a particular output and means for selectively varying the particular output as desired comprising means mounting a plurality of said gearing for shifting movement so that each will impose a different gearing ratio on said train when shifted, means biasing all of said shiftable gearing to non-shift position, and actuators for each shiftable gearing to individually move each shiftable gearing to shift position when activated and when deactivated allowing said gearing to return under the influence of said biasing means each of said actuators having means selectively operable to supply a continuous active force thereto to shift its associated shiftable gearing and actively maintain it in shifted position during the period of its selection.

29. A selectively variable transmission including a gear train having a series of operatively connected zones of different gearing ratio so that an input traveling through said zones will derive a certain output, means coordinating a plurality of said zones to provide shifting of the gearing in each of said zones to one of two positions only, a normal position to provide one gearing ratio and a change position to provide a different gearing ratio, the different gearing ratios, zone by zone, being divergent, all of said gearing being so correlated that a progression of varying outputs can be attained, by either selectively maintaining the shiftable gearing in normal position or by selectively shifting said shiftable gearing, singly or in combinaiton, means biasing the shiftable gearing to their normal positions, and actuators for individually and selectively shifting said shiftable gearing against the force of said biasing means including means individually and continuously supplying selected actuators with a force during the period of their selection.

30. The transmission as set forth in claim 29 in which said biasing means comprises a source of pressure fluid applied constantly to yieldably maintain said gearing in normal position, said actuators including fluid operable means individual to each actuator for overcoming said source of constant pressure to shift its gearing and said means to selectively and actively supply a force includes a source of fluid pressure and means operable singularly or in predetermined desired combinations to connect said source of fluid pressure to selected individual fluid operable means to shift their associated gears and to maintain said connection during the period of their operation.

31. A selectively varied transmission including, a series of coordinated change gearing of different ratios, means constantly biasing said change gearing to a first position wherein an input applied to said transmission will travel through each of said gearing to derive a normal intrinsic output, actuators individual to each of said change gearing adapted to be activated for shifting its gearing against said biasing means to a second position to impose a different ratio on said series to vary said intrinsic output, said actuators being so constructed that when deactivated said change gearing will return to said first position under the influence of said biasing means, and means to individually actuate said actuators singularly or in desired combinations to impose one or a series of change ratios on said transmission to derive the output desired, said last named means including a source of power and means individual to each actuator to connect said source of power thereto throughout the period of its operation.

References Cited by the Examiner

UNITED STATES PATENTS

| | | | |
|---|---|---|---|
| 2,010,556 | 8/35 | Nenninger | 74—346 X |
| 2,263,141 | 11/41 | Peterson | 74—346 X |
| 2,692,511 | 10/54 | Nallinger. | |
| 2,695,541 | 11/54 | Mobius | 82—2 |
| 2,788,678 | 4/57 | Sheppard. | |
| 2,902,873 | 9/59 | Sundt | 74—364 |
| 2,933,936 | 4/60 | McClelland | 74—364 |
| 2,963,945 | 12/60 | Barker et al. | |
| 2,992,565 | 7/61 | Hansen et al. | 74—364 X |
| 2,995,955 | 8/61 | Kelley. | |

DON A. WAITE, *Primary Examiner.*

BROUGHTON G. DURHAM, *Examiner.*